United States Patent
Zhang et al.

(10) Patent No.: US 11,051,267 B2
(45) Date of Patent: Jun. 29, 2021

(54) CHANNEL LATENCY DETERMINING METHOD, POSITIONING METHOD, AND RELATED DEVICE

(71) Applicant: Huawei Technologies Co., Ltd., Shenzhen (CN)

(72) Inventors: Yi Zhang, Shanghai (CN); Feng Zhou, Shanghai (CN); Yaxin Wu, Shanghai (CN); Jiao He, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 16/455,080

(22) Filed: Jun. 27, 2019

(65) Prior Publication Data

US 2019/0320403 A1 Oct. 17, 2019

Related U.S. Application Data

(63) Continuation of application No. PCT/CN2016/112680, filed on Dec. 28, 2016.

(51) Int. Cl.
*H04W 56/00* (2009.01)
*H04W 16/28* (2009.01)
(Continued)

(52) U.S. Cl.
CPC ....... *H04W 56/0095* (2013.01); *H04W 16/28* (2013.01); *H04W 24/10* (2013.01);
(Continued)

(58) Field of Classification Search
CPC . H04W 56/0095; H04W 16/28; H04W 24/10; H04W 56/003; H04W 56/005; H04W 64/003; H04W 64/00
See application file for complete search history.

(56) References Cited

U.S. PATENT DOCUMENTS

| 6,236,365 B1 * | 5/2001 | LeBlanc ............... G01C 21/206 342/457 |
| 6,246,884 B1 | 6/2001 | Karmi et al. |

(Continued)

FOREIGN PATENT DOCUMENTS

| CN | 1306708 A | 8/2001 |
| CN | 100455129 C | 1/2009 |

(Continued)

*Primary Examiner* — Hassan Kizou
*Assistant Examiner* — Abdullahi Ahmed
(74) *Attorney, Agent, or Firm* — Slater Matsil, LLP

(57) ABSTRACT

A channel latency determining method, a positioning method, and device, the method including obtaining, by a communications device, device location information of a calibration user equipment (UE), calculating a propagation delay according to the device location information and prestored location information of an antenna, where the propagation delay is a time between transmitting a radio signal by the calibration UE and receiving the radio signal by the antenna, calculating a time of arrival according to the radio signal transmitted by the calibration UE to the antenna, where the time of arrival is a time obtained through calculation according to a time of arrival (TOA) estimation algorithm, and determining a channel latency according to the propagation delay and the time of arrival, where the channel latency is positively correlated with the time of arrival and is negatively correlated with the propagation delay.

20 Claims, 17 Drawing Sheets

(51) Int. Cl.
*H04W 24/10* (2009.01)
*H04W 64/00* (2009.01)

(52) U.S. Cl.
CPC ....... *H04W 56/003* (2013.01); *H04W 56/005* (2013.01); *H04W 64/003* (2013.01)

(56) References Cited

U.S. PATENT DOCUMENTS

| | | | |
|---|---|---|---|
| 8,655,373 B2 | 2/2014 | Kim | |
| 2006/0009235 A1* | 1/2006 | Sheynblat | G01S 19/48 455/456.1 |
| 2009/0058729 A1* | 3/2009 | Jo | G01S 5/0215 342/387 |
| 2011/0130152 A1 | 6/2011 | Kim | |
| 2011/0207470 A1* | 8/2011 | Meredith | H04W 24/00 455/456.1 |
| 2012/0077514 A1 | 3/2012 | Perkins et al. | |
| 2012/0294231 A1* | 11/2012 | Finlow-Bates | H04W 48/14 370/328 |
| 2013/0267258 A1 | 10/2013 | Yeo et al. | |
| 2017/0195034 A1* | 7/2017 | strom | H04L 45/12 |
| 2018/0316599 A1* | 11/2018 | McDonald | H04L 45/121 |

FOREIGN PATENT DOCUMENTS

| | | |
|---|---|---|
| CN | 102196559 A | 9/2011 |
| CN | 102281629 A | 12/2011 |
| CN | 103220780 A | 7/2013 |
| CN | 106255064 A | 12/2016 |
| GB | 2481851 A | 11/2012 |
| JP | 2003521134 A | 7/2003 |
| JP | 2004533177 A | 10/2004 |
| JP | 2009522879 A | 6/2009 |
| JP | 2013074543 A | 4/2013 |
| JP | 2015045531 A | 3/2015 |
| KR | 20110034570 A | 4/2011 |
| KR | 20160132166 A | 11/2016 |
| WO | 09956413 A1 | 11/1999 |
| WO | 2012004420 A1 | 1/2012 |

\* cited by examiner

CHANNEL LATENCY DETERMINING METHOD, POSITIONING METHOD, AND RELATED DEVICE

CROSS-REFERENCE TO RELATED APPLICATIONS

This application is a continuation of International Application No. PCT/CN2016/112680, filed on Dec. 28, 2016, the disclosure of which is hereby incorporated by reference in its entirety.

TECHNICAL FIELD

Embodiments of the present invention relate to the communications field, and in particular, to a channel latency determining method, a positioning method, a communications device, and a positioning device.

BACKGROUND

Positioning algorithms for a base station side may be roughly classified into two types: a ranging-based positioning algorithm and a non-ranging-based positioning algorithm. The ranging-based positioning algorithm is based on a technology for ranging between nodes. At present, there are generally four technologies for measuring a distance between two nodes: a ranging technology based on a time of arrival (TOA), a ranging technology based on a time difference of arrival (TDOA), a ranging technology based on an angle of arrival (AOA), and a ranging technology based on a received signal strength indicator (RSSI).

A principle of the TOA-based algorithm is that in radio signal transmission, a propagation time is directly proportional to a distance from a target point to a measurement unit. In the TOA technology, a distance between nodes is calculated based on a propagation speed of a signal and a propagation time of the signal. In a two-dimensional positioning scenario, signals propagated from at least three reference points are considered in the TOA algorithm. A distance between a measurement unit and a signal transmitter is calculated by measuring a propagation time.

A theoretical basis for the TDOA-based ranging technology is that in radio signal transmission, a propagation time is directly proportional to a distance from a target point to a measurement unit. A core idea of the TDOA-based ranging technology is to determine a relative location of a moving transmitter by detecting different time at which a signal arrives at a plurality of measurement units.

There are usually two manners of obtaining a TDOA value. A first manner is calculating a difference between time required by a moving point in arriving at a plurality of base stations, that is, TOAs, to estimate a TDOA value. A second manner is performing, by a base station, a generalized cross-correlation (GCC) operation on a signal received at a moving point and a signal received at another moving point, to obtain a TDOA value. According to this algorithm, the TDOA value can be estimated when the base station is not synchronous with a mobile station.

For a positioning device based on the TOA/TDOA mechanism, a TOA obtained through measurement includes both a time delay difference and a channel latency difference of a signal propagated over an air interface.

However, the prior art has the following disadvantages. In an existing network, when TOA/TDOA-based positioning is performed, channel time delays are different because a difference inevitably exists between transmission channels of different base stations. If a channel latency difference cannot be estimated precisely, a distance obtained through calculation based on a TOA value or a distance difference obtained through calculation in a TDOA mechanism-enabled system has a quite large error. Consequently, using such data to perform positioning affects final positioning precision.

SUMMARY

Embodiments of the present invention provide a channel latency determining method, a positioning method, a communications device, and a positioning device, to calculate a channel latency.

A first aspect of the embodiments of the present invention provides a channel latency determining method, including obtaining, by a communications device, device location information of calibration user equipment (UE), calculating, by the communications device, a propagation delay based on the device location information and prestored location information of an antenna, where the propagation delay is a time from transmitting a radio signal by the calibration UE to receiving the radio signal by the antenna, and the device location information is information about a current location of the calibration UE, and calculating, by the communications device, a time of arrival based on the radio signal transmitted by the calibration UE to the antenna, where the time of arrival is a time obtained through calculation according to a TOA estimation algorithm. An antenna used for calculating the time of arrival is the same as that used for calculating the propagation delay, and the time of arrival includes the propagation delay and a channel latency. Therefore, the communications device can determine the channel latency based on the propagation delay and the time of arrival. The channel latency is positively correlated with the time of arrival and is negatively correlated with the propagation delay.

In this way, the communications device can obtain the propagation delay based on the device location information of the calibration UE and the location information of the antenna, and obtain the channel latency based on the propagation delay and the time of arrival. There are a plurality of manners of obtaining the device location information. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

With reference to the first aspect of the embodiments of the present invention, in a first implementation of the first aspect of the embodiments of the present invention, the obtaining, by a communications device, device location information of calibration UE includes obtaining, by the communications device, positioning information of the calibration UE, and determining, by the communications device, the device location information based on the positioning information. The positioning information is information used to determine the device location information, and the poisoning information may be sent by the calibration UE, or may be obtained by the communications device based on the radio signal transmitted by the calibration UE. In this way, in this embodiment of the present invention, there are a plurality of manners of obtaining the device location information of the calibration UE by the communications device. Therefore, diversified user requirements are satisfied by using the method in this embodiment of the present invention.

With reference to the first implementation of the first aspect of the embodiments of the present invention, in a second implementation of the first aspect of the embodiments of the present invention, the determining, by the communications device, the device location information based on the positioning information includes determining, by the communications device, prestored reference location information of a reference object as the device location information when the positioning information satisfies a preset adjacency condition. There are a plurality of types of reference objects, for example, an antenna and a reference node device sending downlink common channel information. The communications device prestores the location information of the reference object, and when the positioning information satisfies the preset adjacency condition, for example, the calibration UE may be located near the reference object, the reference location information of the reference object may be used as the device location information, provided that the preset adjacency condition is accurately determined. In this case, the obtained device location information satisfies a precision requirement in this embodiment of the present invention.

With reference to the second implementation of the first aspect of the embodiments of the present invention, in a third implementation of the first aspect of the embodiments of the present invention, the obtaining, by the communications device, positioning information of the calibration UE includes obtaining, by the communications device, the radio signal transmitted by the calibration UE to at least three antennas, and calculating, based on the radio signal, a reference signal received power (RSRP) of a signal obtained by each antenna, where the RSRP of the signal of the antenna is one of specific implementation forms of the positioning information.

In this implementation, the determining, by the communications device, prestored reference location information of a reference object as the device location information when the positioning information satisfies a preset adjacency condition includes the calibration UE is relatively close to the target antenna in case that an RSRP of a signal obtained by the target antenna is greater than an RSRP of a signal obtained by any other antenna and a difference between the two RSRPs is a preset signal threshold, determining, by the communications device, prestored location information of a target antenna as the device location information, where the target antenna and the any other antenna herein are antennas in the at least three antennas.

In this implementation, the calibration UE transmits a signal to a plurality of antennas, and after obtaining through calculation RSRPs of signals obtained by the antennas, the communications device determines a maximum RSRP, where the calibration UE is relatively close to a target antenna corresponding to the maximum RSRP. If a difference between the maximum RSRP and an RSRP of any other antenna is a preset signal threshold, after location information of the target antenna is determined as the device location information, the device location information satisfies a requirement in this embodiment of the present invention. In this way, the communications device obtains the device location information.

With reference to the third implementation of the first aspect of the embodiments of the present invention, in a fourth implementation of the first aspect of the embodiments of the present invention, to further increase a confidence level, a preset quantity of antennas in the plurality of antennas are made point to a preset direction, where the preset direction is a direction in which the antennas face the calibration UE, for example, the antennas are under the calibration UE. Optionally, the antennas include passive antennas or active antennas.

With reference to the second implementation of the first aspect of the embodiments of the present invention, in a fifth implementation of the first aspect of the embodiments of the present invention, the obtaining, by the communications device, positioning information of the calibration UE includes obtaining, by the calibration UE through calculation, neighboring cell measurement information based on downlink common channel information sent by a reference node, reporting, by the calibration UE, the neighboring cell measurement information to the communications device, and obtaining, by the communications device, the neighboring cell measurement information sent by the calibration UE, where the communications device prestores location information of the reference node, and the neighboring cell measurement information is one of specific implementation forms of the positioning information.

In this implementation, the determining, by the communications device, prestored reference location information of a reference object as the device location information when the positioning information satisfies a preset adjacency condition includes selecting, by the communications device, the prestored location information of the reference node as the device location information when the neighboring cell measurement information is greater than a preset neighboring cell threshold. When the neighboring cell measurement information is greater than the preset neighboring cell threshold, it indicates that the calibration UE is relatively close to the reference node, and therefore using the location information of the reference node as the device location information of the calibration UE can satisfy a precision requirement in the method in this implementation. In this way, the communications device obtains the device location information.

With reference to the first implementation of the first aspect of the embodiments of the present invention, in a sixth implementation of the first aspect of the embodiments of the present invention, the obtaining, by the communications device, positioning information of the calibration UE includes obtaining, by the communications device, the radio signal transmitted by the calibration UE to the antenna, and calculating, by the communications device, an angle at which the radio signal arrives at the antenna, where the angle is one of specific implementation forms of the positioning information.

Therefore, in this implementation, the determining, by the communications device, the device location information based on the positioning information includes calculating, by the communications device, the device location information based on the angle by using an AOA mechanism. Calculating the device location information based on the angle by using the AOA mechanism is a positioning method performed by the communications device, and AOA-based positioning is determining a location of UE by calculating an angle between a signal transmitted by the UE and an antenna. In contrast, in this implementation, the time of arrival is calculated based on a TOA mechanism, and a time required by the signal transmitted by the UE to arrive at the antenna is used in the TOA-based mechanism. In this case, the two different mechanisms are jointly used to determine the device location information. When another UE is being positioned, after the channel latency is obtained based on the device location information, the time of arrival is calculated by using the TOA/TDOA mechanism, the channel latency is subtracted from the time of arrival, and the another UE is positioned, to increase positioning precision. In this way, mutual calibration is performed based on results obtained by using the two mechanisms, thereby increasing system positioning precision.

With reference to the sixth implementation of the first aspect of the embodiments of the present invention, in a seventh implementation of the first aspect of the embodiments of the present invention, after the calculating, by the communications device, the device location information based on the angle by using an AOA mechanism, the method in this implementation further includes calculating, by the communications device, a confidence level of the device location information based on the signal of the calibration UE, and when the confidence level is greater than a preset confidence level threshold, performing, by the communications device, the step of calculating a propagation delay based on the device location information and prestored location information of an antenna. The device location information obtained through calculation based on the angle by using the AOA mechanism may be inaccurate, and the device location information satisfying a requirement can be selected by using this implementation method, to increase precision of the obtained device location information and channel latency.

With reference to the first implementation of the first aspect of the embodiments of the present invention, in an eighth implementation of the first aspect of the embodiments of the present invention, the obtaining, by the communications device, positioning information of the calibration UE includes measuring, by the calibration UE, downlink reference signal received power to obtain downlink RSRPs of at least three cells, and sending the information to the communications device, so that the communications device obtains the downlink RSRPs of the at least three cells sent by the calibration UE, where the downlink RSRP is the downlink reference signal received power measured by the calibration UE, the antennas used for calculating the channel latency are antennas of the at least three cells, and the downlink RSRP of the cell is one of specific implementation forms of the positioning information.

In this implementation, the determining, by the communications device, the device location information based on the positioning information includes matching, by the communications device, the downlink RSRP with a target downlink RSRP, to obtain a match degree, where the communications device prestores a correspondence between the target downlink RSRP and target location information, and selecting, by the communications device, the target location information corresponding to the target downlink RSRP as the device location information when the match degree is greater than a preset match degree threshold. The correspondence between the target downlink RSRP and the target location information may be established after the target downlink RSRP of the at least three cells is manually measured in advance by using the UE at a target location. If the match degree is greater than the preset match degree threshold, it indicates that the calibration UE is currently located at or near a location indicated in the target location information, and using the target location information as the device location information satisfies a precision requirement in this implementation. In this way, the communications device obtains the device location information.

With reference to the first aspect of the embodiments of the present invention, in a ninth implementation of the first aspect of the embodiments of the present invention, the obtaining, by a communications device, device location information of calibration UE includes obtaining, by the communications device, the device location information sent by the calibration UE, where the device location information is obtained by the calibration UE by using a positioning module disposed on the calibration UE. To be specific, after obtaining the information about the current location of the calibration UE by using the positioning module such as a global positioning system (GPS) or a Beidou navigation satellite system configured on the calibration UE, the calibration UE uses the location information as the device location information, and sends the device location information to the communications device. In this way, the communications device obtains the device location information.

With reference to the ninth implementation of the first aspect of the embodiments of the present invention, in a tenth implementation of the first aspect of the embodiments of the present invention, after the obtaining, by the communications device, the device location information sent by the calibration UE, the method in this implementation further includes calculating, by the communications device, a signal-power-to-noise-power ratio (SNS) based on the radio signal transmitted by the calibration UE, where the SNS is used to determine whether to use the calibration UE as calibration UE for calculating the channel latency, and when the SNS is greater than a preset SNS threshold, that is, the calibration UE satisfies a requirement for calculating the channel latency, performing, by the communications device, the step of calculating a propagation delay based on the device location information and prestored location information of an antenna.

With reference to the first aspect of the embodiments of the present invention, in an eleventh implementation of the first aspect of the embodiments of the present invention, the obtaining, by a communications device, device location information of calibration UE includes obtaining, by the communications device, the device location information of the calibration UE sent by a positioning apparatus.

With reference to any one of the first aspect of the embodiments of the present invention, or the first to the eleventh implementations of the first aspect of the embodiments of the present invention, in a twelfth implementation of the first aspect of the embodiments of the present invention, the determining, by the communications device, a channel latency based on the propagation delay and the time of arrival includes determining, by the communications device, the channel latency based on the propagation delay and the time of arrival by using a first preset formula.

Because the time of arrival includes two parts: the channel latency and the propagation delay, the first preset formula is $T_{channel} = T_{toa} - T_{pass}$, so as to obtain a relatively accurate channel latency.

$T_{pass}$ represents a propagation delay, $T_{toa}$ represents a time of arrival, and $T_{channel}$ represents a channel latency.

A second aspect of the embodiments of the present invention provides a channel latency determining method, including obtaining, by a communications device, information about a distance between calibration UE and an antenna, where the distance information is obtained through measurement by a ranging device, calculating, by the communications device, a propagation delay based on the distance information, where the propagation delay is a time during which a radio signal transmitted by the calibration UE is propagated over an air interface before the radio signal arrives at the antenna, that is, the propagation delay is a time from transmitting the radio signal by the calibration UE to receiving the radio signal by the antenna, and calculating, by the communications device, a time of arrival based on the radio signal transmitted by the calibration UE to the antenna, where the time of arrival is a time obtained through calculation according to a TOA estimation algorithm. The time of arrival includes the propagation delay and a channel latency. Therefore, the communications device can determine the channel latency based on the propagation delay and the time of arrival. The channel latency is positively correlated with the time of arrival and is negatively correlated with the propagation delay.

In this way, the communications device can obtain the propagation delay based on the information about the distance between the calibration UE and the antenna, and obtain the channel latency based on the propagation delay and the time of arrival. There are a plurality of manners of obtaining the device location information. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

With reference to the second aspect of the embodiments of the present invention, in a first implementation of the second aspect of the embodiments of the present invention, a propagation path between the calibration UE and the antenna is a line of sight (LOS) propagation path, so as to increase precision of calculating the channel latency.

With reference to the second aspect or the first implementation of the second aspect of the embodiments of the present invention, in a second implementation of the second aspect of the embodiments of the present invention, the determining, by the communications device, a channel latency based on the propagation delay and the time of arrival includes determining, by the communications device, the channel latency based on the propagation delay and the time of arrival by using a first preset formula. Because the time of arrival includes two parts: the channel latency and the propagation delay, the first preset formula is $T_{channel} = T_{toa} - T_{pass}$, so as to obtain a relatively accurate channel latency.

$T_{pass}$ represents a propagation delay, $T_{toa}$ represents a time of arrival, and $T_{channel}$ represents a channel latency.

A third aspect of the embodiments of the present invention provides a channel latency determining method, including transmitting, by a plurality of calibration UEs, radio signals to antennas of a station, and after the antennas receive the radio signals, calculating, by a communications device, a time of arrival based on a radio signal transmitted by each calibration UE to the antenna of each station, where the time of arrival is a time obtained through calculation according to a TOA estimation algorithm, there are M stations and N calibration UEs, M and N are positive integers greater than 0, and M×N≥2×N+M+N−1, substituting, by the communications device, prestored location information of the station into a propagation delay expression to obtain a propagation delay, where the propagation delay expression includes device location information of the calibration UE, the device location information is an unknown number, the propagation delay is a time from transmitting the radio signal by the calibration UE to receiving the radio signal by the antenna, and in this case, the propagation delay is represented by using the device location information and the location information of the station, and calculating a channel latency based on the propagation delay and the time of arrival.

The channel latency is positively correlated with the time of arrival and is negatively correlated with the propagation delay, the channel latency is negatively correlated with a delay adjustment value, and the delay adjustment value is an unknown number.

In this way, after substituting the location information of the station into the propagation delay expression, the communications device obtains the propagation delay represented by using the location information of the station and the device location information of the calibration UE, and can obtain channel latencies based on a plurality of propagation delays and a plurality of times of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

With reference to the third aspect of the embodiments of the present invention, in a first implementation of the third aspect of the embodiments of the present invention, the propagation delay expression is:

$$T_{pass} = \text{sqrt}((eNb\_x^j - Ue\_x^i)^2 + (eNb\_y^j - Ue\_y^i)^2)/c$$

The calculating a channel latency based on the propagation delay and the time of arrival includes calculating the channel latency based on the propagation delay and the time of arrival by using a second preset formula, and the propagation delay and the time of arrival are substituted into the second preset formula to obtain the following formula:

$$T_{toa}^{i,j} = T_{channel}^j + \text{sqrt}((eNb\_x^j - Ue\_x^i)^2 + (eNb\_y^j - Ue\_y^i)^2)/c + TA^i$$

where $T_{toa}^{i,j}$ represents a time of arrival of a radio signal from $i^{th}$ calibration UE to an antenna of a $j^{th}$ station, $T_{channel}^j$ represents a channel latency of the $j^{th}$ station, $(eNb\_x^j, eNb\_y^j)$ represents location information of the $j^{th}$ station, $(Ue\_x^i, Ue\_y^i)$ represents device location information of the $i^{th}$ calibration UE, c represents a propagation speed of the radio signal, $T_{pass}$ represents a propagation delay, $TA^i$ represents a delay adjustment value of the $i^{th}$ calibration UE, sqrt represents a square root function, and i and j are natural numbers.

Such a second preset formula is simple and easy for calculation, and a calculation result satisfies a requirement in this implementation.

A fourth aspect of the embodiments of the present invention provides a positioning method, including calculating, by a positioning device, a channel latency $T'_{channel}$, where the channel latency includes a time for processing data inside a station and a radio frequency transmission time, and a method for calculating the channel latency $T'_{channel}$ is any one of the foregoing implementations, calculating, by the positioning device, a time of arrival $T'_{toa}$ based on a radio signal transmitted by target UE to an antenna, where the antenna belongs to the foregoing base station, calculating, by the positioning device, a propagation delay $T'_{pass}$ according to a preset calibration formula, where the preset calibration formula is $T'_{pass} = T'_{toa} - T'_{channel}$, and the propagation delay $T'_{pass}$ is obtained after the channel latency is subtracted from the time of arrival, and calculating, by the positioning device, location information of the target UE based on the propagation delay by using a TOA/TDOA mechanism, so that the location information is not affected by the channel latency of the station. Because stations are configured differently, channel latencies of different stations may be different. At least three antennas need to be used for calculating the location information of the target UE by using the TOA/TDOA mechanism, and channel latencies generated between these antennas and corresponding stations may be different. Therefore, in this implementation method, during calculation of the location information of the target UE, impact made by the channel latencies between these antennas and the stations is eliminated by using the foregoing step, and even if channel latencies between different antennas and stations are different, these different channel latencies do not affect calculation of the location of the target UE. This increases positioning precision in this implementation.

A fifth aspect of the embodiments of the present invention provides a communications device, where the communications device has a function of the communications device in the foregoing method. The function may be implemented by using hardware or may be implemented by hardware executing corresponding software. The hardware or software includes one or more modules corresponding to the function.

In a possible implementation, the communications device includes an obtaining unit, configured to obtain device location information of calibration UE, a first calculation unit, configured to calculate a propagation delay based on the device location information and prestored location information of an antenna, where the propagation delay is a time from transmitting a radio signal by the calibration UE to receiving the radio signal by the antenna, a second calculation unit, configured to calculate a time of arrival based on the radio signal transmitted by the calibration UE to the antenna, where the time of arrival is a time obtained through calculation according to a TOA estimation algorithm, and a third calculation unit, configured to determine a channel latency based on the propagation delay and the time of arrival, where the channel latency is positively correlated with the time of arrival and is negatively correlated with the propagation delay.

In another possible implementation, the communications device includes a transceiver and a processor, where the transceiver performs obtaining device location information of calibration UE, the processor performs calculating a propagation delay based on the device location information and prestored location information of an antenna, where the propagation delay is a time from transmitting a radio signal by the calibration UE to receiving the radio signal by the antenna, the processor performs calculating a time of arrival based on the radio signal transmitted by the calibration UE to the antenna, where the time of arrival is a time obtained through calculation according to a TOA estimation algorithm, and the processor performs determining a channel latency based on the propagation delay and the time of arrival, where the channel latency is positively correlated with the time of arrival and is negatively correlated with the propagation delay.

A sixth aspect of the embodiments of the present invention provides a computer storage medium, where the computer storage medium stores program code, and the program code is used to perform the method according to the first aspect.

A seventh aspect of the embodiments of the present invention provides a communications device, where the communications device has a function of the communications device in the foregoing method. The function may be implemented by using hardware or may be implemented by hardware executing corresponding software. The hardware or software includes one or more modules corresponding to the function.

In a possible implementation, the communications device includes an obtaining unit, configured to obtain information about a distance between calibration UE and an antenna, where the distance information is obtained through measurement by a ranging device, a first calculation unit, configured to calculate a propagation delay based on the distance information, where the propagation delay is a time from transmitting a radio signal by the calibration UE to receiving the radio signal by the antenna, a second calculation unit, configured to calculate a time of arrival based on the radio signal transmitted by the calibration UE to the antenna, where the time of arrival is a time obtained through calculation according to a TOA estimation algorithm, and a third calculation unit, configured to determine a channel latency based on the propagation delay and the time of arrival, where the channel latency is positively correlated with the time of arrival and is negatively correlated with the propagation delay.

In another possible implementation, the communications device includes a transceiver and a processor, where the transceiver performs obtaining information about a distance between calibration UE and an antenna, where the distance information is obtained through measurement by a ranging device, the processor performs calculating a propagation delay based on the distance information, where the propagation delay is a time from transmitting a radio signal by the calibration UE to receiving the radio signal by the antenna, the processor performs calculating a time of arrival based on the radio signal transmitted by the calibration UE to the antenna, where the time of arrival is a time obtained through calculation according to a TOA estimation algorithm, and the processor performs determining a channel latency based on the propagation delay and the time of arrival, where the channel latency is positively correlated with the time of arrival and is negatively correlated with the propagation delay.

An eighth aspect of the embodiments of the present invention provides a computer storage medium, where the computer storage medium stores program code, and the program code is used to perform the method according to the second aspect.

A ninth aspect of the embodiments of the present invention provides a communications device, where the communications device has a function of the communications device in the foregoing method. The function may be implemented by using hardware or may be implemented by hardware executing corresponding software. The hardware or software includes one or more modules corresponding to the function.

In a possible implementation, the communications device includes a first calculation unit, configured to calculate a time of arrival based on a radio signal transmitted by each calibration UE to an antenna of each station, where the time of arrival is a time obtained through calculation according to a TOA estimation algorithm, there are M stations and N calibration UEs, M and N are positive integers greater than 0, and $M \times N \geq 2 \times N + M + N - 1$, a substitution unit, configured to substitute prestored location information of the station into a propagation delay expression to obtain a propagation delay, where the propagation delay expression includes device location information of the calibration UE, the device location information is an unknown number, and the propagation delay is a time from transmitting the radio signal by the calibration UE to receiving the radio signal by the antenna, and a second calculation unit, configured to calculate a channel latency based on the propagation delay and the time of arrival, where the channel latency is positively correlated with the time of arrival and is negatively correlated with the propagation delay, the channel latency is negatively correlated with a delay adjustment value, and the delay adjustment value is an unknown number.

In another possible implementation, the communications device includes a processor, where the processor performs calculating a time of arrival based on a radio signal transmitted by each calibration UE to an antenna of each station, where the time of arrival is a time obtained through calculation according to a TOA estimation algorithm, there are M stations and N calibration UEs, M and N are positive integers greater than 0, and M×N≥2×N+M+N−1, the processor performs substituting prestored location information of the station into a propagation delay expression to obtain a propagation delay, where the propagation delay expression includes device location information of the calibration UE, the device location information is an unknown number, and the propagation delay is a time from transmitting the radio signal by the calibration UE to receiving the radio signal by the antenna, and the processor performs calculating a channel latency based on the propagation delay and the time of arrival, where the channel latency is positively correlated with the time of arrival and is negatively correlated with the propagation delay, the channel latency is negatively correlated with a delay adjustment value, and the delay adjustment value is an unknown number.

A tenth aspect of the embodiments of the present invention provides a computer storage medium, where the computer storage medium stores program code, and the program code is used to perform the method according to the third aspect.

An eleventh aspect of the embodiments of the present invention provides a positioning device, where the positioning device has a function of the positioning device in the foregoing method. The function may be implemented by using hardware or may be implemented by hardware executing corresponding software. The hardware or software includes one or more modules corresponding to the function.

In a possible implementation, the positioning device includes a channel latency calculation unit, configured to calculate a channel latency $T'_{channel}$, where the channel latency includes a time for processing data inside a station and a radio frequency transmission time, a time-of-arrival calculation unit, configured to calculate a time of arrival $T'_{doa}$ based on a radio signal transmitted by target UE to an antenna, where the antenna belongs to the station, a propagation delay calculation unit, configured to calculate a propagation delay $T'_{pass}$ according to a preset calibration formula, where the preset calibration formula is $T'_{pass}=T'_{toa}-T'_{channel}$, and a positioning unit, configured to calculate location information of the target UE based on the propagation delay by using a TOA/TDOA mechanism, where the channel latency calculation unit includes apparatuses included in the communications device according to any one of the fifth aspect, the seventh aspect, or the ninth aspect.

In another possible implementation, the positioning device includes a processor, where the processor performs determining a channel latency $T'_{channel}$, where the channel latency includes a time for processing data inside a station and a radio frequency transmission time, the processor performs calculating a time of arrival $T_{doa}$ based on a radio signal transmitted by target UE to an antenna, where the antenna belongs to the station, the processor performs calculating a propagation delay $T'_{pass}$ according to a preset calibration formula, where the preset calibration formula is $T'_{pass}=T'_{toa}-T'_{channel}$, and the processor performs calculating location information of the target UE based on the propagation delay by using a TOA/TDOA mechanism, where the processor includes apparatuses included in the communications device according to any one of the fifth aspect, the seventh aspect, or the ninth aspect.

A twelfth aspect of the embodiments of the present invention provides a computer storage medium, where the computer storage medium stores program code, and the program code is used to perform the method according to the fourth aspect.

According to the technical solutions provided in the embodiments of the present invention, the communications device obtains the propagation delay based on geographical information of the calibration UE or the station, where the propagation delay is the time from transmitting the radio signal by the calibration UE to receiving the radio signal by the antenna, the communications device further calculates the time of arrival based on the radio signal transmitted by the calibration UE to the antenna, where the time of arrival is the time obtained through calculation according to the TOA estimation algorithm, and the communications device obtains the channel latency through calculation based on the obtained time of arrival and the obtained propagation delay, where the channel latency is positively correlated with the time of arrival and is negatively correlated with the propagation delay. In this way, the communications device can obtain the propagation delay based on the geographical information of the calibration UE or the station, and obtain the channel latency through calculation based on the propagation delay and the time of arrival, where the geographical information of the calibration UE or the station may include the device location information of the calibration UE, the location information of the antenna of the station, the location information of the station, the information about the distance between the calibration UE and the antenna, and the like. Therefore, in the embodiments of the present invention, the channel latency can be accurately measured, and during the process of positioning the another UE by using the TOA/TDOA mechanism-based positioning method, the channel latency can be subtracted from the time of arrival. This increases positioning precision in the positioning mechanism affected by the channel latency.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that data termed in such a way are interchangeable in proper circumstances, so that the embodiments described herein can be implemented in other orders than the order illustrated or described herein. Moreover, the terms "include", "comprise" and any other variants thereof mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
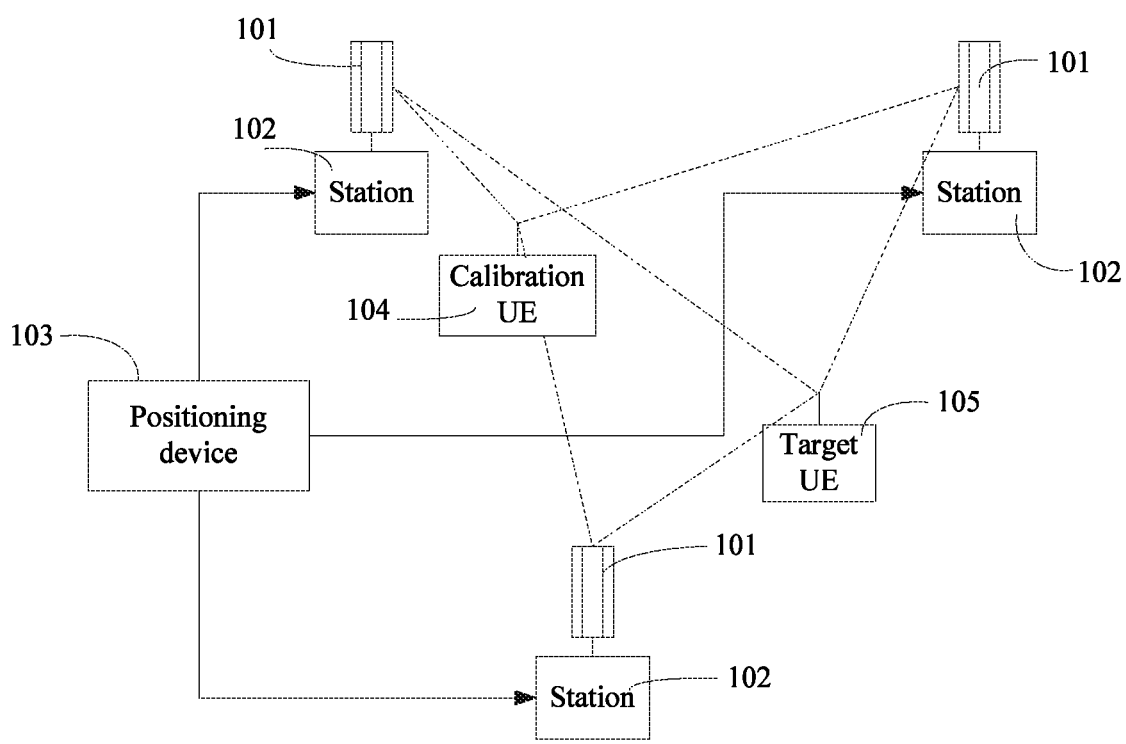
FIG. 1 is a diagram of a use scenario of a channel latency determining method according to an embodiment of the present invention.

FIG. 1 is a diagram of a use scenario of a channel latency determining method according to an embodiment of the present invention. In this use scenario, an antenna 101, a station 102, a positioning device 103, and user equipment (UE) are included. The UE includes calibration UE 104 and target UE 105, signals transmitted by the calibration UE and the target UE can be obtained by an antenna, the antenna belongs to a corresponding station, and the positioning device is connected to the station or the antenna. The station may be a base station.

The positioning device in the embodiments of the present invention may be alternatively a communications device in another form.

According to the technical solutions provided in the embodiments of the present invention, a communications device obtains a propagation delay based on geographical information of the calibration UE or the station, where the propagation delay is a time from transmitting a radio signal by the calibration UE to receiving the radio signal by the antenna, the communications device further calculates a time of arrival based on the radio signal transmitted by the calibration UE to the antenna, where the time of arrival is a time obtained through calculation according to a TOA estimation algorithm, and the communications device obtains a channel latency through calculation based on the obtained time of arrival and the obtained propagation delay, where the channel latency is positively correlated with the time of arrival and is negatively correlated with the propagation delay. In this way, the communications device can obtain the propagation delay based on the geographical information of the calibration UE or the station, and obtain the channel latency through calculation based on the propagation delay and the time of arrival, where the geographical information of the calibration UE or the station may include device location information of the calibration UE, location information of the antenna of the station, location information of the station, information about a distance between the calibration UE and the antenna, and the like. Therefore, in the embodiments of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

It can be understood that the use scenario shown in FIG. 1 is merely one of scenarios in the embodiments of the present invention, and a plurality of practical scenarios may also be included in the embodiments of the present invention.

The embodiments of the present invention provide a channel latency determining method, and a channel latency obtained by using this method is used for a positioning method in which positioning calibration is performed to increase positioning precision. There are a plurality of specific channel latency determining methods, and the following details the methods.

The following describes three channel latency determining methods. Different geographical information of the calibration UE or the station is used for the three specific channel latency determining methods. For details, refer to embodiments shown in FIG. 2, FIG. 14, and FIG. 19. After a channel latency is obtained by using one of these methods, the channel latency may be used for a positioning method in which positioning calibration is performed to increase positioning precision. In an embodiment shown in FIG. 4, during a process of positioning another UE by using a TOA/TDOA mechanism-based positioning method, the channel latency can be subtracted from a time of arrival. This increases positioning precision in a positioning mechanism affected by the channel latency.

The following three channel latency determining methods may be applied to a communications device, where the communications device may be specifically a positioning device. After the communications device performs the channel latency determining method provided in each embodiment of the present invention, the channel latency can be obtained, and during positioning, the positioning device uses a result of the channel latency to eliminate impact made by the channel latency, to increase positioning precision. To make descriptions more intuitive and clearer, and make a description of an embodiment corresponding to the channel latency determining method more correspond to that of an embodiment corresponding to the positioning method, the positioning device is used as an example to perform the following embodiments of the channel latency determining methods. It can be understood that the embodiments of the channel latency determining methods may be alternatively performed by another communications device, and the communications device is unnecessarily used for positioning, provided that the communications device can perform the channel latency determining methods in the embodiments of the present invention.

Figure 2:
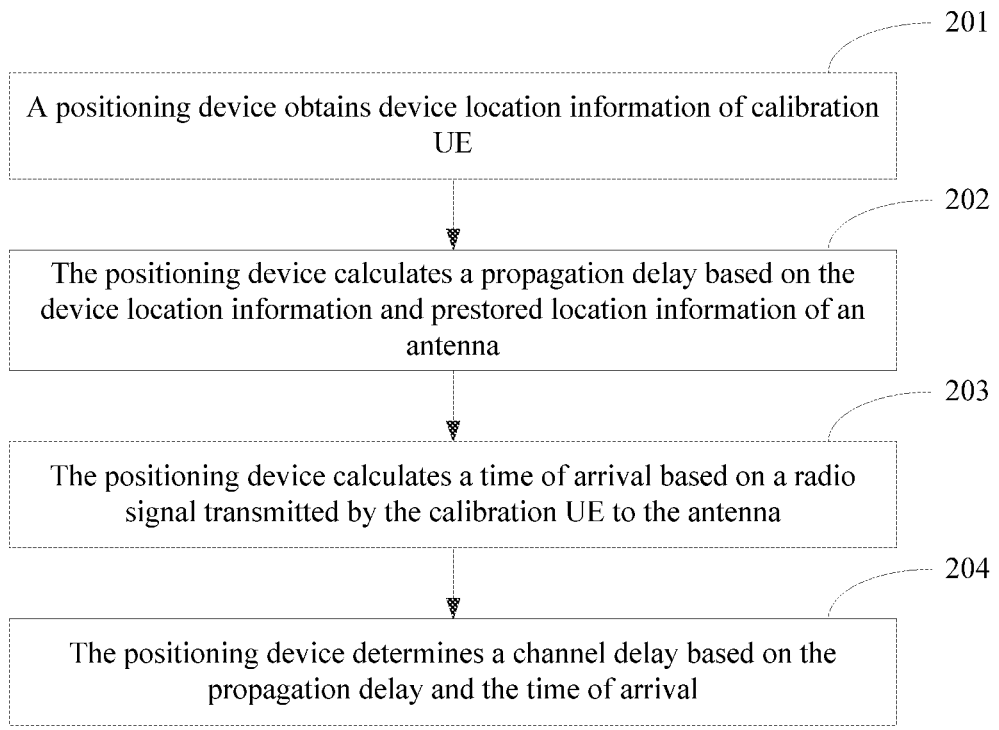
FIG. 2 is a method flowchart of a channel latency determining method according to another embodiment of the present invention.

FIG. 2 is a method flowchart of a channel latency determining method according to an embodiment of the present invention. The method is applied to a communications device, where the communications device may be a positioning device. Based on the use scenario shown in FIG. 1 and the foregoing content, referring to FIG. 2, the channel latency determining method in this embodiment of the present invention includes the following steps.

Step 201: The positioning device obtains device location information of calibration UE.

The calibration UE is reference UE used in the channel latency determining method. The UE may be UE used by any user, or UE specially used to determine a channel latency, and the device location information is information about a current location of the calibration UE. In this embodiment of the present invention, there are a plurality of methods for obtaining the device location information by the positioning device, and this is not specifically limited in this embodiment of the present invention. For a specific method for obtaining the device location information, refer to descriptions in the following embodiments.

Step 202: The positioning device calculates a propagation delay based on the device location information and prestored location information of an antenna.

The propagation delay is a time during which a radio signal transmitted by the calibration UE is propagated over an air interface before the radio signal arrives at the antenna, that is, the propagation delay is a time from transmitting the radio signal by the calibration UE to receiving the radio signal by the antenna.

The positioning device prestores the location information of the antenna. A method for obtaining the location information of the antenna by the positioning device is not specifically limited in this embodiment of the present invention. For example, the location information of the antenna may be directly entered by working personnel to the positioning device.

There may be at least three antennas in this embodiment of the present invention. These antennas may belong to a same base station, or may belong to different base stations. One base station is corresponding to a plurality of cells, the base station may include a plurality of antennas, and each cell is corresponding to an antenna of the cell. Channel latencies corresponding to antennas may be different in this embodiment of the present invention.

A specific manner of calculating the propagation delay may be that the positioning device obtains a distance between the calibration UE and the antenna through calculation based on the device location information and the location information of the antenna, and divides the distance by a propagation speed of the radio signal, to obtain the propagation delay required by the signal transmitted by the calibration UE to arrive at the antenna. The propagation speed of the radio signal may be a precise speed, or may be data satisfying preset precision. For example, the propagation speed may be a light speed of 0.3 m/ns.

Step 203: The positioning device calculates a time of arrival based on a radio signal transmitted by the calibration UE to the antenna.

The time of arrival is a time obtained through calculation according to a TOA estimation algorithm.

The antenna in step 203 is the same as the antenna in step 202, and at least three antennas are required for calculation of the time of arrival according to the TOA estimation algorithm. Therefore, the prestored location information of the antenna in step 202 is location information of at least three antennas.

A specific method for calculating the time of arrival may be, for example, calculating the time of arrival based on the signal that is transmitted by the calibration UE and received by the positioning device, or based on a signal that is transmitted by the antenna end and received by the calibration UE side. For example, there are three specific calculation manners. A first type mainly includes algorithms such as a cross-correlation algorithm and a matched filtering algorithm. A second type is a cost function-based estimation method. A third type is a feature structure-based estimation method.

Step 204: The positioning device determines a channel latency based on the propagation delay and the time of arrival.

The channel latency is positively correlated with the time of arrival and is negatively correlated with the propagation delay. There are a plurality of specific channel latency determining methods. For example, the positioning device determines the channel latency based on the propagation delay and the time of arrival by using a first preset formula.

In the first preset formula, the channel latency is positively correlated with the time of arrival and is negatively correlated with the propagation delay. A specific form of the first preset formula is not specifically limited in this embodiment of the present invention, provided that the channel latency is positively correlated with the time of arrival and is negatively correlated with the propagation delay.

The channel latency in this embodiment of the present invention includes a time for processing data inside a base station and a time for transmitting a signal on a radio frequency cable. To obtain the accurate channel latency through calculation, the first preset formula is $T_{channel} = T_{toa} - T_{pass}$ in some embodiments.

$T_{pass}$ represents a propagation delay, $T_{toa}$ represents a time of arrival, and $T_{channel}$ represents a channel latency.

In summary, after the positioning device obtains the device location information of the calibration UE, the positioning device calculates the propagation delay based on the device location information and the prestored location information of the antenna, where the propagation delay is the time from transmitting the radio signal by the calibration UE to receiving the radio signal by the antenna, the positioning device calculates the time of arrival based on the radio signal transmitted by the calibration UE to the antenna, where the time of arrival is the time obtained through calculation according to the TOA estimation algorithm, and the positioning device can obtain the channel latency through calculation based on the propagation delay and the time of arrival, where the channel latency is positively correlated with the time of arrival and is negatively correlated with the propagation delay. In this way, the positioning device can obtain the propagation delay based on the device location information of the calibration UE and the location information of the antenna, and obtain the channel latency based on the propagation delay and the time of arrival. There are a plurality of manners of obtaining the device location information. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

According to the method in this embodiment of the present invention, after the channel latency is obtained through calculation, the channel latency can be utilized in a plurality of scenarios. This is not specifically limited in this embodiment of the present invention. For example, in the TOA/TDOA mechanism-based positioning method, there is a difference between channels of different stations, resulting in a difference between delays caused by the channels. After the channel latency is obtained through calculation by using the channel latency determining method in this embodiment of the present invention, a measurement error resulting from the channel latency can be eliminated by using the TOA/TDOA mechanism-based positioning method, thereby increasing positioning precision.

Figure 3:
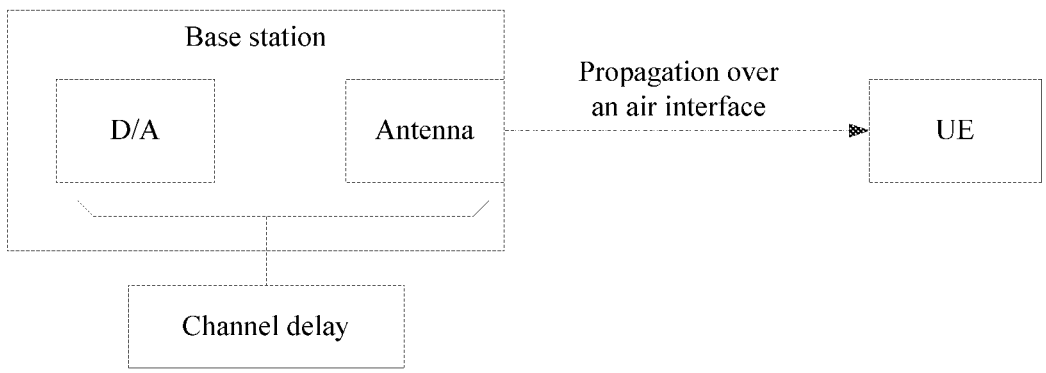
FIG. 3 is a diagram of a use scenario of a positioning method according to another embodiment of the present invention.

FIG. 3 is a diagram of a use scenario of a positioning method according to an embodiment of the present invention. It can be learnt from FIG. 3 that a time of arrival TOA obtained through calculation by a TOA/TDOA mechanism-based positioning device includes two time periods. The time of arrival TOA includes a channel latency of a signal on a base station side and a propagation time of the signal over an air interface, and the channel latency on the base station side includes a baseband processing time of the signal and a propagation time of the signal on a radio frequency cable. After the channel latency is obtained by using the method provided in this embodiment of the present invention, the channel latency is subtracted from the TOA, and a location of UE is obtained based on the result by using a TOA/TDOA mechanism. This can increase positioning precision in the positioning method.

Figure 4:
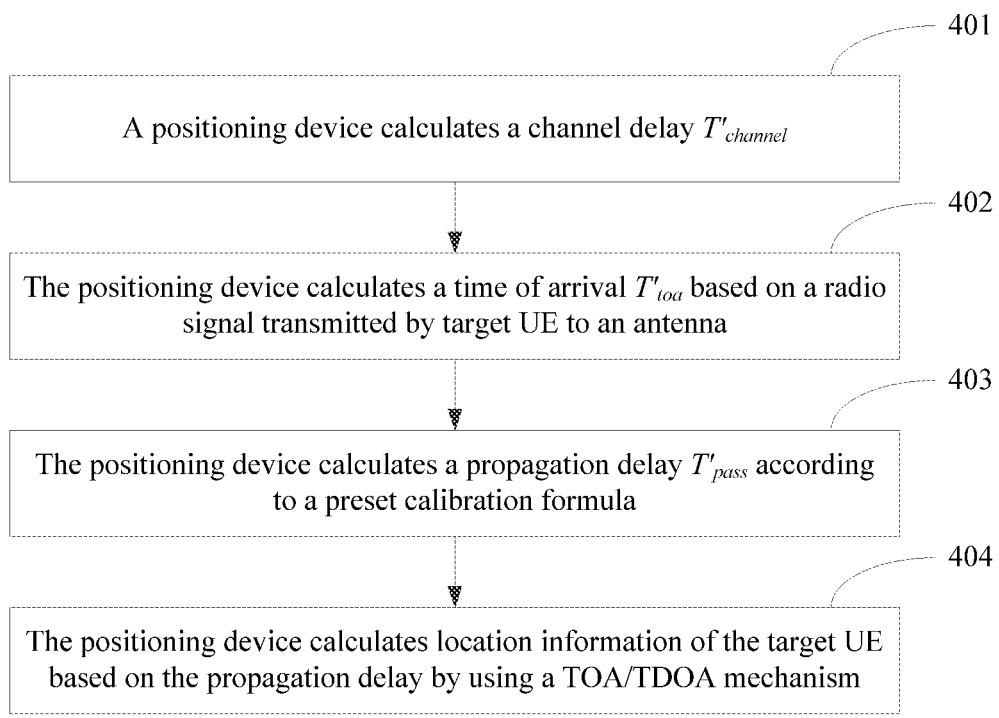
FIG. 4 is a method flowchart of a positioning method according to another embodiment of the present invention.

An embodiment of the present invention further provides a positioning method. As shown in FIG. 4, the positioning method in this embodiment of the present invention includes the following steps.

Step 401: A positioning device calculates a channel latency $T'_{channel}$.

The channel latency includes a time for processing data inside a station and a radio frequency transmission time.

The step of calculating a channel latency $T'_{channel}$ includes the channel latency calculation method in the embodiment shown in FIG. 2. Specifically, the method may be any one of channel latency determining methods described in the following embodiments.

Step 402: The positioning device calculates a time of arrival $T'_{toa}$ based on a radio signal transmitted by target UE to an antenna.

A station related to the channel latency in step 401 is the same as a station to which the antenna in step 402 belongs. In other words, the antenna belongs to the station.

The target UE may be UE of a common user or another to-be-positioned UE.

A specific method for calculating the time of arrival $T'_{doa}$ by the positioning device may be calculating the time of arrival based on a signal that is transmitted by the calibration UE and received by the positioning device, or based on a signal that is transmitted by the antenna end and received by the calibration UE side. For example, there are three specific calculation manners. A first type mainly includes algorithms such as a cross-correlation algorithm and a matched filtering algorithm. A second type is a cost function-based estimation method. A third type is a feature structure-based estimation method.

Step 403: The positioning device calculates a propagation delay $T'_{pass}$ according to a preset calibration formula.

The preset calibration formula is $T'_{pass} = T'_{toa} - T'_{channel}$.

The propagation delay $T'_{pass}$ is a time during which a signal transmitted by the target UE is propagated over an air interface before the signal arrives at the antenna. The channel delay is subtracted from the time of arrival through calculation by using the preset calibration formula, so that the obtained propagation delay is unrelated to a channel on a base station side and is not affected by the channel latency.

Step 404: The positioning device calculates location information of the target UE based on the propagation delay by using a TOA/TDOA mechanism.

After calculating the channel latency $T'_{channel}$, the positioning device calculates the time of arrival $T'_{toa}$ based on the radio signal transmitted by the target UE to the antenna, calculates the propagation delay $T'_{pass}$ according to the preset calibration formula, where the preset calibration formula is $T'_{pass} = T'_{toa} - T'_{channel}$, and calculates the location information of the target UE based on the propagation delay by using the TOA/TDOA mechanism. Because the propagation delay is unrelated to the channel on the base station side and is not affected by the channel latency, the obtained location information of the target UE is not affected by a difference between channels of different stations. This increases positioning precision in the positioning method in this embodiment of the present invention.

It can be understood that the channel latency determining method and the positioning method that are provided in the embodiments of the present invention can be used for user positioning in an asynchronous system in a UMTS/WIFI/LTE field. This can implement automatic channel calibration in the asynchronous system, and increase positioning precision based on the TOA/TDOA mechanism.

The embodiments of the present invention provide a plurality of manners of obtaining the device location information of the calibration UE by the positioning device. The following describes the manners.

Manner 1: Obtaining Device Location Information Directly from Calibration UE

Figure 5:
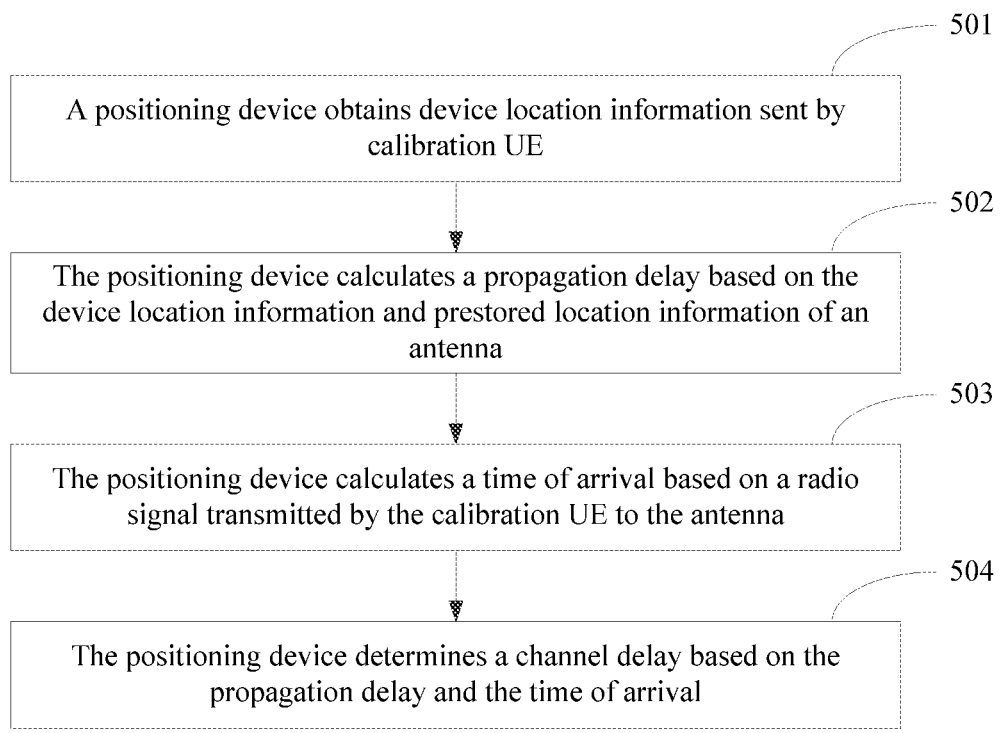
FIG. 5 is a method flowchart of a channel latency determining method according to another embodiment of the present invention.

FIG. 5 is a method flowchart of a channel latency determining method according to an embodiment of the present invention. In the method shown in FIG. 5, calibration UE may obtain information about a current location of the calibration UE, and a positioning device obtains the device location information sent by the calibration UE, and determines a channel latency based on the device location information. Based on the diagram of the use scenario shown in FIG. 1 and the foregoing content, referring to FIG. 5, the method in this embodiment of the present invention includes the following steps.

Step 501: The positioning device obtains device location information sent by the calibration UE.

The device location information is obtained by the calibration UE by using a positioning module disposed on the calibration UE.

A positioning module is configured on the calibration UE, and the positioning module may be a positioning apparatus such as a GPS or a Beidou navigation satellite system. Location information with precision of approximately 10 meters can be obtained by using these positioning apparatuses. Therefore, the calibration UE can obtain relatively accurate device location information of the calibration UE by using the positioning apparatus such as a GPS or a Beidou navigation satellite system. After obtaining the device location information, the calibration UE sends the device location information to the positioning device, and the positioning device can obtain the channel latency through calculation based on the device location information, to increase system positioning precision.

After obtaining the device location information reported by the calibration UE, the positioning device can calculate the channel latency immediately by using the device location information, or the positioning device can store the device location information, and read the device location information from a storage module when the device location information needs to be used. In this case, the calibration UE may have been offline, but the calibration UE can still be used.

In some embodiments of the present invention, a positioning center may obtain device location information of a plurality of calibration UEs, and in this case, the positioning center may select device location information of one of the calibration UEs according to a preset rule. The preset rule may be, for example, selecting calibration UE with a highest signal strength or a highest signal-power-to-noise-power ratio (SNS) as the calibration UE used for calculation.

In some embodiments of the present invention, to determine whether the calibration UE is suitable for channel latency determining, after the positioning device obtains the device location information sent by the calibration UE, the method in this embodiment of the present invention further includes calculating, by the positioning device, a signal-power-to-noise-power ratio SNS based on a radio signal transmitted by the calibration UE, and when the SNS is greater than a preset SNS threshold, performing, by the positioning device, a step of calculating a propagation delay based on the device location information and prestored location information of an antenna, so as to use the calibration UE for channel latency calculation.

Step 502: The positioning device calculates a propagation delay based on the device location information and prestored location information of an antenna.

The propagation delay is a time from transmitting the radio signal by the calibration UE to receiving the radio signal by the antenna.

For step 502, refer to step 202.

Step 503: The positioning device calculates a time of arrival based on a radio signal transmitted by the calibration UE to the antenna.

The time of arrival is a time obtained through calculation according to a TOA estimation algorithm.

For step 503, refer to step 203.

Step 504: The positioning device determines a channel latency based on the propagation delay and the time of arrival.

The channel latency is positively correlated with the time of arrival and is negatively correlated with the propagation delay.

For step 504, refer to step 204.

In some embodiments of the present invention, after the channel latency is obtained according to the embodiment shown in FIG. 5, the channel latency is used to obtain the location information of the UE. In other words, the positioning method shown in FIG. 4 is performed.

For example, after the channel latency $T'_{channel}$ is obtained through calculation by using the method in FIG. 5, when UE of a user is being positioned, a corresponding time of arrival $T'_{toa}$ is first obtained through calculation, and then a propagation delay $T'_{pass}$ after the channel latency is subtracted is calculated according to a preset calibration formula, where the preset calibration formula is $T'_{pass}=T'_{toa}-T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

It can be understood that in some embodiments of the present invention, the obtaining, by the positioning device, device location information of the calibration UE may be obtaining, by the positioning device, the device location information of the calibration UE sent by the positioning apparatus. The positioning apparatus may determine the device location information of the calibration UE. For example, the positioning apparatus is located near the calibration UE, and the positioning apparatus has a positioning function of a GPS or a Beidou navigation satellite system.

In the embodiment shown in FIG. 5, the obtaining, by the positioning device, device location information is obtaining the device location information sent by the calibration UE. In this case, a positioning function of the calibration UE is utilized, simplifying the method and the corresponding device in this embodiment of the present invention.

In some embodiments of the present invention, the positioning device obtains positioning information of the calibration UE. The positioning information may be information sent by the calibration UE or may be information generated based on a signal transmitted by the calibration UE, and the positioning information is used to determine the device location information of the calibration UE. The positioning device can determine the device location information of the calibration UE based on the positioning information.

In other words, in some embodiments of the present invention, the step of obtaining, by the positioning device, device location information of calibration UE in the embodiment shown in FIG. 2 specifically includes obtaining, by the positioning device, positioning information of the calibration UE, and determining, by the positioning device, the device location information based on the positioning information.

Specific content of the positioning information is not specifically limited in this embodiment of the present invention, and may vary in different use scenarios. The following provides four specific embodiments to detail the specific content of the positioning information.

Two embodiments are described first. In the two embodiments, a reference object is used to determine the device location information of the calibration UE. The positioning device prestores location information of a reference object, and after the positioning device obtains the positioning information of the calibration UE, the determining, by the positioning device, the device location information based on the positioning information specifically includes determining, by the positioning device, prestored reference location information of the reference object as the device location information when the positioning information satisfies a preset adjacency condition.

In other words, in some embodiments of the present invention, the location information of the reference object is used as the device location information of the calibration UE, provided that the calibration UE satisfies a specific condition. The reference object may be an antenna, a reference node, or another device. This is not specifically limited in this embodiment of the present invention. For an embodiment of determining the device location information of the calibration UE based on the location information of the reference object, refer to the following two embodiments.

Manner 2: Using an Antenna as a Reference Object

Figure 6:
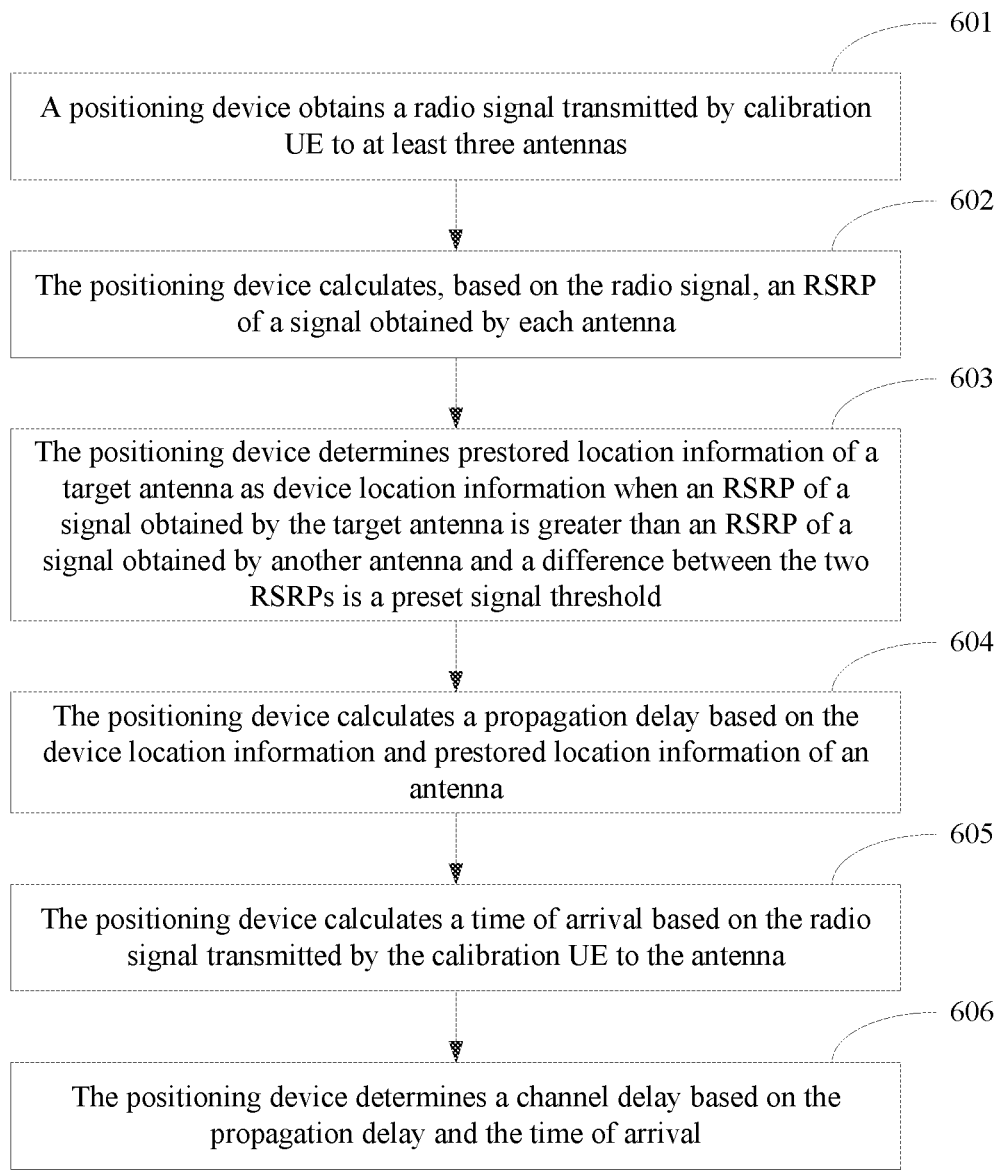
FIG. 6 is a method flowchart of a channel latency determining method according to another embodiment of the present invention.

FIG. 6 is a method flowchart of a channel latency determining method according to an embodiment of the present invention. Based on the foregoing content, referring to FIG. 6, the method in this embodiment of the present invention includes the following steps.

Step 601: A positioning device obtains a radio signal transmitted by calibration UE to at least three antennas.

The positioning device includes at least three antennas, where the at least three antennas may receive the radio signal transmitted by the calibration UE.

The three antennas may belong to a same station, or may belong to different stations.

The antennas may include passive antennas or active antennas, for example, include an RRU.

Step 602: The positioning device calculates an RSRP of a signal obtained by each antenna based on the radio signal.

After obtaining the radio signal by using the antennas, for each antenna, the positioning device calculates, based on the radio signal received by the antenna, an RSRP of the signal received by the antenna. The reference signal received power (RSRP) is an average value of powers at which signals are received on all resource elements (RE), corresponding to a symbol, that carry a pilot signal. The RSRP is used to identify a pilot strength of a cell, that is, a power of a single pilot subcarrier, and does not include noise and interference. This parameter is related to a path loss during a signal propagation process.

Step 601 and step 602 are one of specific implementations of the obtaining positioning information of the calibration UE by the positioning device. The RSRP is a specific form of the positioning information.

Step 603: The positioning device determines prestored location information of a target antenna as device location information when an RSRP of a signal obtained by the target antenna is greater than an RSRP of a signal obtained by any other antenna and a difference between the two RSRPs is a preset signal threshold.

The target antenna and the any other antenna are antennas in the at least three antennas.

After obtaining the RSRP of the signal obtained by each antenna, the positioning device compares RSRPs of signals of these antennas. If the RSRP of the signal obtained by the target antenna is greater than the RSRP of the signal obtained by the any other antenna and the difference between the two RSRPs is the preset signal threshold, that is, the RSRP of the signal obtained by the target antenna is obviously greater than the RSRP of the any other antenna, it may be considered that the calibration UE is located near the target antenna. In this case, the positioning device may use the location information of the target antenna as the device location information of the calibration UE, provided that the positioning device prestores the location information of the target antenna. The target antenna may be an antenna that is predetermined as a reference object by a system, provided that the positioning device prestores the location information of the target antenna. However, the target antenna is preferably one of the three antennas. Therefore, the positioning device prestores location information of the three antennas, and after determining the target antenna corresponding to a signal with a relatively large RSRP, uses the location information of the target antenna.

The preset signal threshold may be set based on an experiment status, provided that the preset signal threshold can ensure that the calibration UE is located near the target antenna. When the calibration UE is located near the target antenna, the location information of the target antenna is used as the device location information of the calibration UE, and in this case, a generated error is within a tolerable error range of calculation precision in this embodiment of the present invention.

It can be learnt from the foregoing that the use scenario of the method in this embodiment of the present invention is especially applicable to a case in which a location of an antenna can be reached by a user of the calibration UE. This helps the positioning device use the prestored location information of the target antenna as the device location information.

Figure 7:
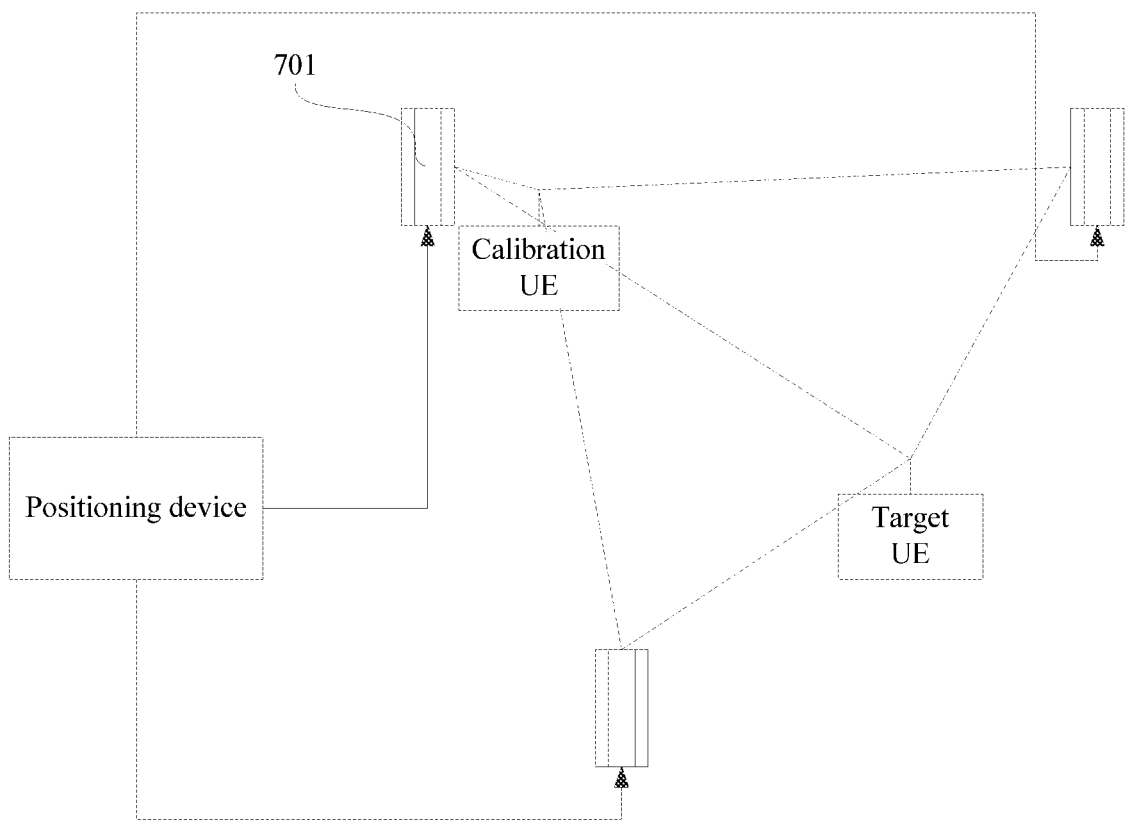
FIG. 7 is a diagram of a use scenario of the method shown in FIG. 6.

For example, FIG. 7 is a diagram of a use scenario of the method in the embodiment shown in FIG. 6. When calibration UE is located near a target antenna 701, the calibration UE transmits a radio signal, and an RSRP of a signal obtained by the target antenna is greater than an RSRP of a signal obtained by any other antenna. By performing steps 601 to 603, the positioning device uses location information of the target antenna as device location information of the calibration UE when determining that the RSRP of the signal obtained by the target antenna is greater than the RSRP of the signal obtained by the any other antenna and that a difference between the two RSRPs is a preset signal threshold.

Step 603 is one of specific cases of the determining, by the positioning device, prestored reference location information of the reference object as the device location information when the positioning information satisfies a preset adjacency condition.

Step 604: The positioning device calculates a propagation delay based on the device location information and prestored location information of an antenna.

The propagation delay is a time during which a radio signal transmitted by the calibration UE is propagated over an air interface before the radio signal arrives at the antenna, that is, the propagation delay is a time from transmitting the radio signal by the calibration UE to receiving the radio signal by the antenna.

For step 604, refer to step 202.

Step 605: The positioning device calculates a time of arrival based on the radio signal transmitted by the calibration UE to the antenna.

The time of arrival is a time obtained through calculation according to a TOA estimation algorithm.

For step 605, refer to step 203.

Step 606: The positioning device determines a channel latency based on the propagation delay and the time of arrival.

The channel latency is positively correlated with the time of arrival and is negatively correlated with the propagation delay.

For step 606, refer to step 204.

To further increase a confidence level in this embodiment of the present invention, in some embodiments of the present invention, a preset quantity of antennas in the plurality of antennas are made point to a preset direction, where the preset direction is a direction in which the antennas face the calibration UE, for example, the antennas are under the calibration UE.

For example, some antennas may be set to have obvious directivity and point to a specific direction. For example, typically, the antennas are under the calibration UE.

In some embodiments of the present invention, after the channel latency is obtained according to the embodiment shown in FIG. 6, the channel latency is used to obtain the location information of the UE. In other words, the positioning method shown in FIG. 4 is performed.

For example, after the channel latency $T'_{channel}$ is obtained through calculation by using the method in FIG. 6, when UE of a user is being positioned, a corresponding time of arrival $T'_{doa}$ is first obtained through calculation, and then a propagation delay $T'_{pass}$ after the channel latency is subtracted is calculated according to a preset calibration formula, where the preset calibration formula is $T'_{pass} = T'_{toa} - T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

In the embodiment shown in FIG. 6, when the calibration UE arrives at a location near the target antenna, the positioning device may determine, based on the signal of the calibration UE, whether to use the location information of the target antenna as the device location information of the calibration UE.

Manner 3: Using a Reference Node as a Reference Object

Figure 8:
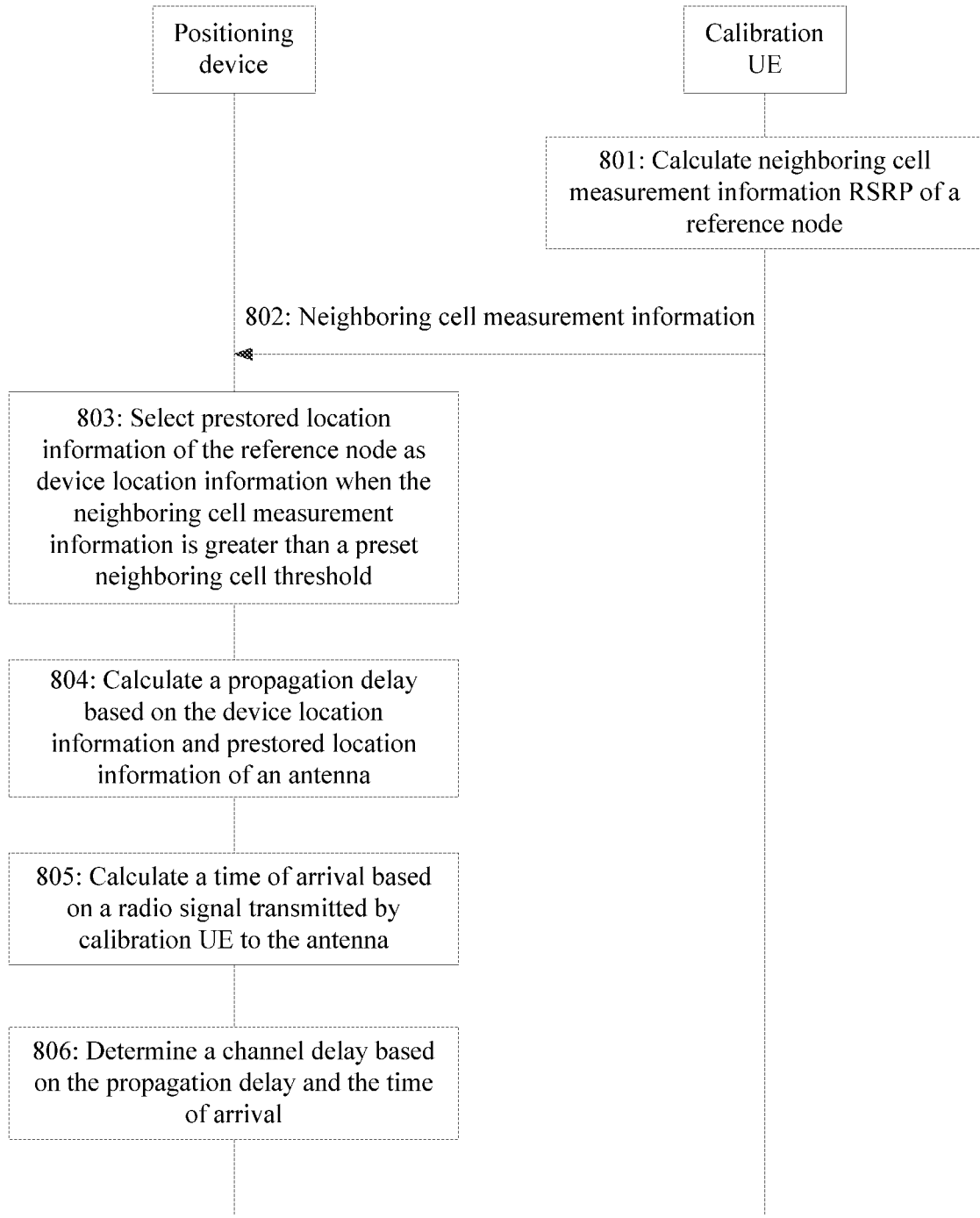
FIG. 8 is a method flowchart of a channel latency determining method according to another embodiment of the present invention.

FIG. 8 is a method flowchart of a channel latency determining method according to an embodiment of the present invention. In the embodiment shown in FIG. 5, the foregoing reference object is a reference node. Referring to a use scenario shown in FIG. 9, a reference node, calibration UE, and a plurality of antennas are included in the use scenario shown in FIG. 9.

A positioning center collects a radio signal transmitted by a user, and determines, based on neighboring cell measurement information reported by UE, whether the UE is located near a reference point. If it is considered that the UE is located near the reference point, it may be considered that a location of the reference node is a location of the UE.

Figure 9:
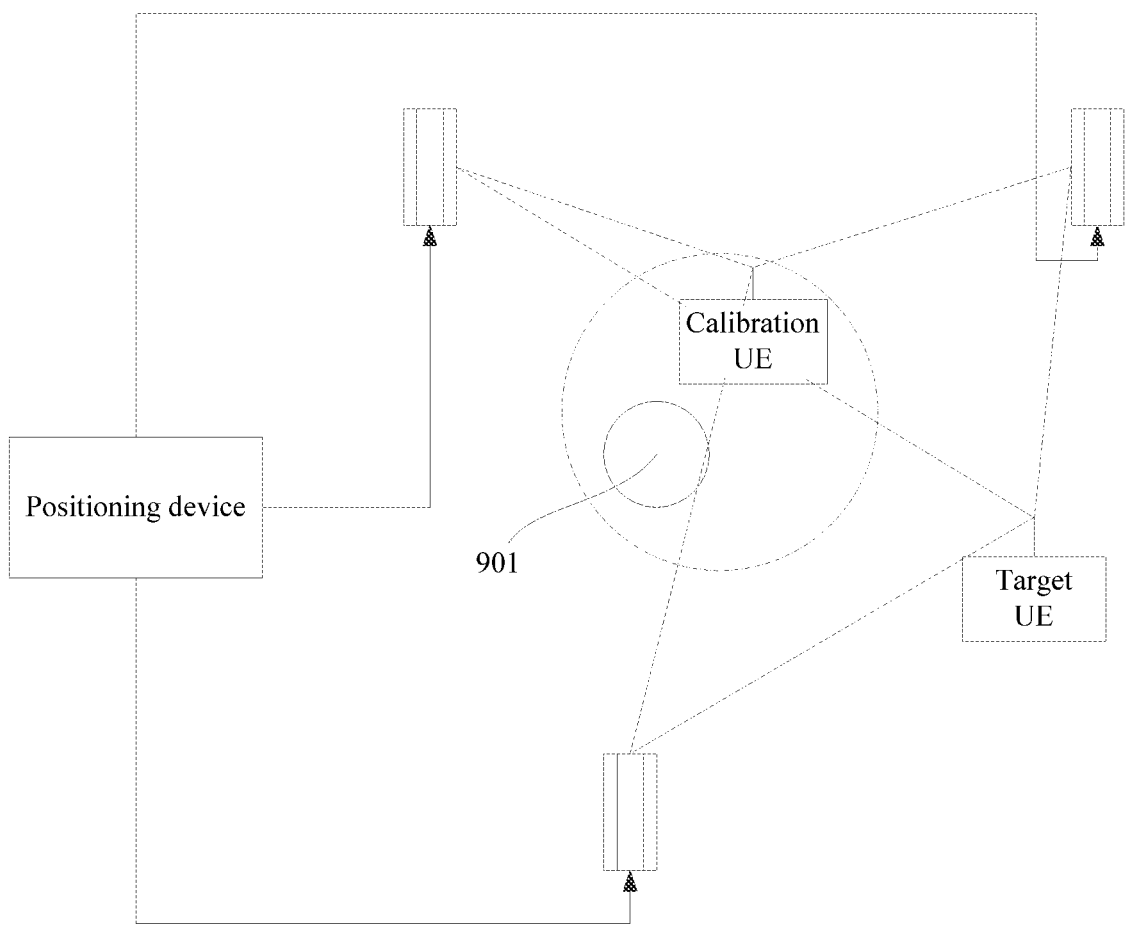
FIG. 9 is a diagram of a use scenario of the method shown in FIG. 8.

Based on the diagram of the use scenario shown in FIG. 9 and the foregoing content, referring to FIG. 8, the method in this embodiment of the present invention includes the following steps.

Step 801: The calibration UE calculates neighboring cell measurement information RSRP of the reference node.

The neighboring cell measurement information is obtained through calculation by the calibration UE based on downlink common channel information sent by the reference node.

When the calibration UE is within a signal coverage area of the reference node, the calibration UE calculates the neighboring cell measurement information RSRP of the reference node.

As shown in FIG. 9, in this embodiment of the present invention, reference nodes that provide small-power signal coverage are deployed within a coverage area of a base station. The reference nodes are devices sending the downlink common channel information. A positioning device prestores location information of the reference node.

Step 802: A positioning device obtains the neighboring cell measurement information sent by the calibration UE.

The calibration UE reports the neighboring cell measurement information to the positioning device, so that the positioning device obtains the neighboring cell measurement information.

Step 803: The positioning device selects prestored location information of the reference node as device location information when the neighboring cell measurement information is greater than a preset neighboring cell threshold.

After obtaining the neighboring cell measurement information sent by the calibration UE, the positioning device determines whether the neighboring cell measurement information is greater than the preset neighboring cell threshold. If the neighboring cell measurement information is greater than the preset neighboring cell threshold, it may be considered that the calibration UE is located near the reference node, and the positioning device determines the location information of the reference node as the device location information.

The preset neighboring cell threshold may be obtained through testing. For example, when a distance from the calibration UE to the reference node satisfies a requirement of calculation precision in this embodiment of the present invention, the neighboring cell measurement information that is obtained through calculation by the calibration UE based on the downlink common channel information of the reference node is the preset neighboring threshold. The distance may be, for example, 5 meters or 10 meters.

Step 803 is one of specific implementations of the determining, by the positioning device, prestored reference location information of the reference object as the device location information when the positioning information satisfies a preset adjacency condition.

Step 804: The positioning device calculates a propagation delay based on the device location information and prestored location information of an antenna.

The propagation delay is a time from transmitting a radio signal by the calibration UE to receiving the radio signal by the antenna.

For step 804, refer to step 202.

Step 805: The positioning device calculates a time of arrival based on the radio signal transmitted by the calibration UE to the antenna.

The time of arrival is a time obtained through calculation according to a TOA estimation algorithm.

For step 805, refer to step 203.

Step 806: The positioning device determines a channel latency based on the propagation delay and the time of arrival.

The channel latency is positively correlated with the time of arrival and is negatively correlated with the propagation delay.

For step 806, refer to step 204.

In some embodiments of the present invention, after the channel latency is obtained according to the embodiment shown in FIG. 8, the channel latency is used to obtain the location information of the UE. In other words, the positioning method shown in FIG. 4 is performed.

For example, after the channel latency $T'_{channel}$ is obtained through calculation by using the method in FIG. 8, when UE of a user is being positioned, a corresponding time of arrival $T'_{doa}$ is first obtained through calculation, and then a propagation delay $T'_{pass}$ after the channel latency is subtracted is calculated according to a preset calibration formula, where the preset calibration formula is $T'_{pass}=T'_{toa}-T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

In the embodiment shown in FIG. 8, third-party measurement information is not required, and only a reference node that provides small-power signal coverage and whose location information is known needs to be deployed within the coverage area of the base station, where the node sends only the downlink common channel information. The positioning center determines, based on the neighboring cell measurement information reported by the UE, whether the UE is located near the reference node. If it is considered that the UE is located near the reference node, it may be considered that the location of the reference node is the location of the UE.

The reference object is used to determine the device location information of the calibration UE in the foregoing embodiment, while two different positioning mechanisms are used in the following embodiment. Specifically, a joint positioning mechanism of an angle of arrival (AOA) and TOA/TDOA is used to calculate a channel latency based on a positioning result estimated by using an AOA, so that the channel latency can be used to increase positioning precision in a TOA/TDOA algorithm.

Figure 10:
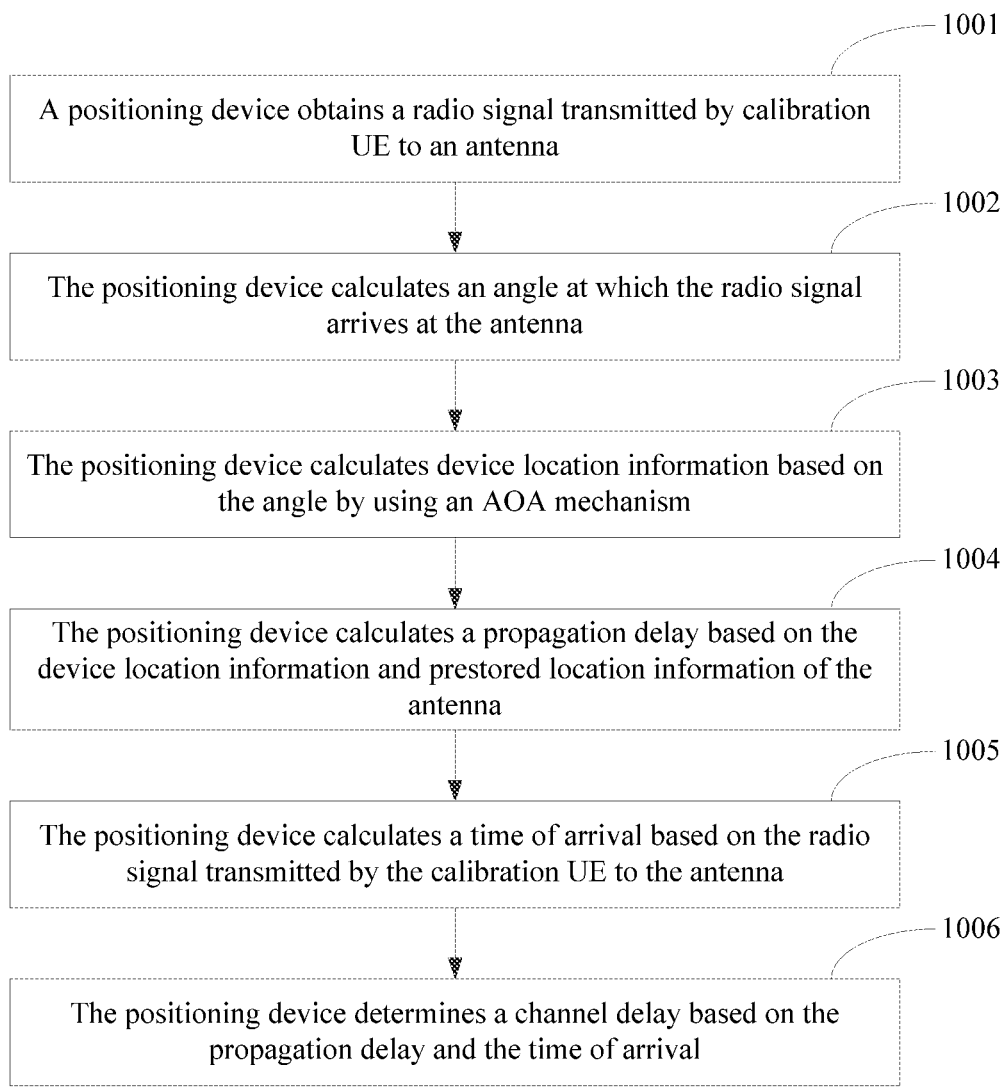
FIG. 10 is a method flowchart of a channel latency determining method according to another embodiment of the present invention.

Manner 4: Determining a Channel Latency Based on a Result Estimated by Using an AOA FIG. 10 is a method flowchart of a channel latency determining method according to an embodiment of the present invention. Based on the schematic diagram of the use environment shown in FIG. 1 and the foregoing content, in the embodiment shown in FIG. 10, the method in this embodiment of the present invention includes the following steps.

Step 1001: A positioning device obtains a radio signal transmitted by calibration UE to an antenna.

The calibration UE transmits the radio signal, and the antenna of the positioning device obtains the radio signal.

At least two antennas of one station forms an antenna array, and an antenna of the antenna array obtains the radio signal transmitted by the calibration UE.

Step 1002: The positioning device calculates an angle at which the radio signal arrives at the antenna.

The positioning device obtains the radio signal transmitted by the calibration UE, to calculate the angle at which the radio signal arrives at the antenna. Obtaining of the angle satisfies a requirement of an AOA mechanism.

The angle is positioning information, and the positioning device can obtain location information of the calibration UE based on the angle.

Figure 11:
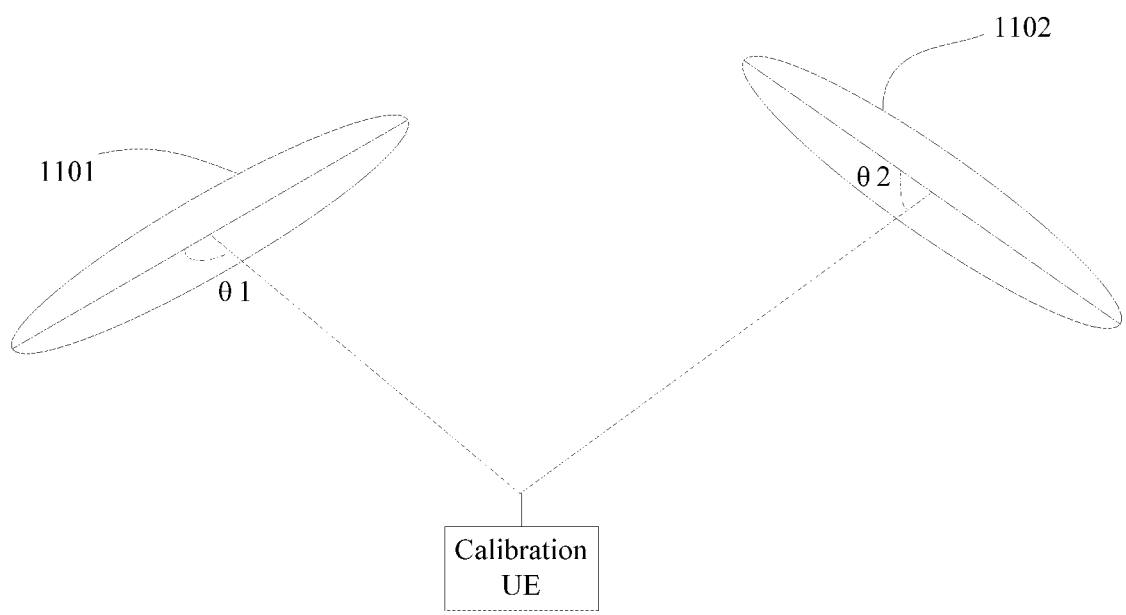
FIG. 11 is a diagram of a use scenario of the method shown in FIG. 10.

For example, FIG. 11 is a diagram of a use scenario according to an embodiment of the present invention. In the figure, an antenna 1101 and an antenna 1102 are included, and a radio signal transmitted by calibration UE is obtained by the two antennas. A positioning center may obtain, through calculation, angles at which the signal arrives at the antennas, for example, an angle θ1 at which the radio signal of the calibration UE arrives at the antenna 1101 and an angle θ2 at which the radio signal of the calibration UE arrives at the antenna 1102.

Step 1001 and step 1002 are one of specific implementations of the obtaining the positioning information of the calibration UE by the positioning device.

Step 1003: The positioning device calculates device location information based on the angle by using an AOA mechanism.

After obtaining the positioning information, the positioning device can determine the device location information based on the positioning information. In this embodiment of the present invention, the positioning information is the angle obtained in the foregoing step, and the positioning device can obtain the device location information of the calibration UE through calculation based on the angle by using the AOA mechanism.

In the following step 1006, a TOA mechanism is used to calculate a propagation delay, to obtain a channel latency through calculation, and in step 1001 to step 1003, the AOA mechanism is used to calculate the device location information. Therefore, the AOA and TOA joint mechanism is applied to obtain the channel latency in the method in this embodiment of the present invention. After the channel latency is obtained, location information of another UE may be obtained based on the channel latency by using the TOA/TDOA mechanism. In other words, the AOA and TOA/TDOA joint positioning is performed in this method. AOA-based positioning is determining the device location information of the calibration UE by calculating an angle between the signal transmitted by the calibration UE and the antenna, and TOA/TDOA mechanism-based positioning is positioning the UE by calculating a time required by the signal transmitted by the UE to arrive at the antenna. The two mechanisms are two different positioning mechanisms, and therefore mutual calibration can be performed based on results obtained by using the two mechanisms, to increase system positioning precision.

Optionally, to improve reliability of the device location information obtained based on the AOA mechanism, in some embodiments of the present invention, a positioning result needs to be further selected based on confidence levels of positioning results after step 1003 is performed. To be specific, after the positioning device calculates the device location information based on the angle by using the AOA mechanism, the method in this embodiment of the present invention further includes calculating, by the positioning device, a confidence level of the device location information based on the signal of the calibration UE, and when the confidence level is greater than a preset confidence level threshold, performing, by the positioning device, the step of calculating a propagation delay based on the device location information and prestored location information of an antenna. In this way, if the device location information whose confidence level satisfies a requirement is highly reliable, the device location information may be used to perform the following step, to obtain the channel latency through calculation. This avoids obtaining a channel latency with a large error due to use of device location information that does not satisfy the requirement.

A specific method for calculating a confidence level may be calculating the confidence level of the device location information based on parameters such as a signal-to-noise ratio of the signal transmitted by the calibration UE and a system bandwidth. The preset confidence level threshold may be obtained through testing or by experience.

Step 1004: The positioning device calculates a propagation delay based on the device location information and prestored location information of an antenna.

The propagation delay is a time from transmitting the radio signal by the calibration UE to receiving the radio signal by the antenna.

For step 1004, refer to step 202.

Step 1005: The positioning device calculates a time of arrival based on the radio signal transmitted by the calibration UE to the antenna.

The time of arrival is a time obtained through calculation according to a TOA estimation algorithm.

For step 1005, refer to step 203.

Step 1006: The positioning device determines a channel latency based on the propagation delay and the time of arrival.

The channel latency is positively correlated with the time of arrival and is negatively correlated with the propagation delay.

For step 1006, refer to step 204.

In some embodiments of the present invention, after the channel latency is obtained according to the embodiment shown in FIG. 100, the channel latency is used to obtain the location information of the UE. In other words, the positioning method shown in FIG. 4 is performed.

For example, after the channel latency $T'_{channel}$ is obtained through calculation by using the method in FIG. 100, when UE of a user is being positioned, a corresponding time of arrival $T'_{doa}$ is first obtained through calculation, and then a propagation delay $T'_{pass}$ after the channel latency is subtracted is calculated according to a preset calibration formula, where the preset calibration formula is $T'_{pass} = T'_{toa} - T'_{channel}$.

Then, a location of the UE is calculated based on the obtained propagation delay $T'_{pass}$ excluding the channel latency and by using the TOA/TDOA mechanism. Because the channel latency is subtracted for the location of the UE obtained in this way, precision of the location information is increased, and a result of the location information is more accurate.

In the embodiment shown in FIG. 10, the positioning device performs AOA+TOA/TDOA joint positioning, and calculates the channel latency based on the result estimated by using the AOA, to increase positioning precision in the TOA/TDOA algorithm of a system.

The channel latency is alternatively determined in another manner in the embodiments of the present invention, as described in the following embodiment.

Manner 5: Feature Matching Manner

Figure 12:
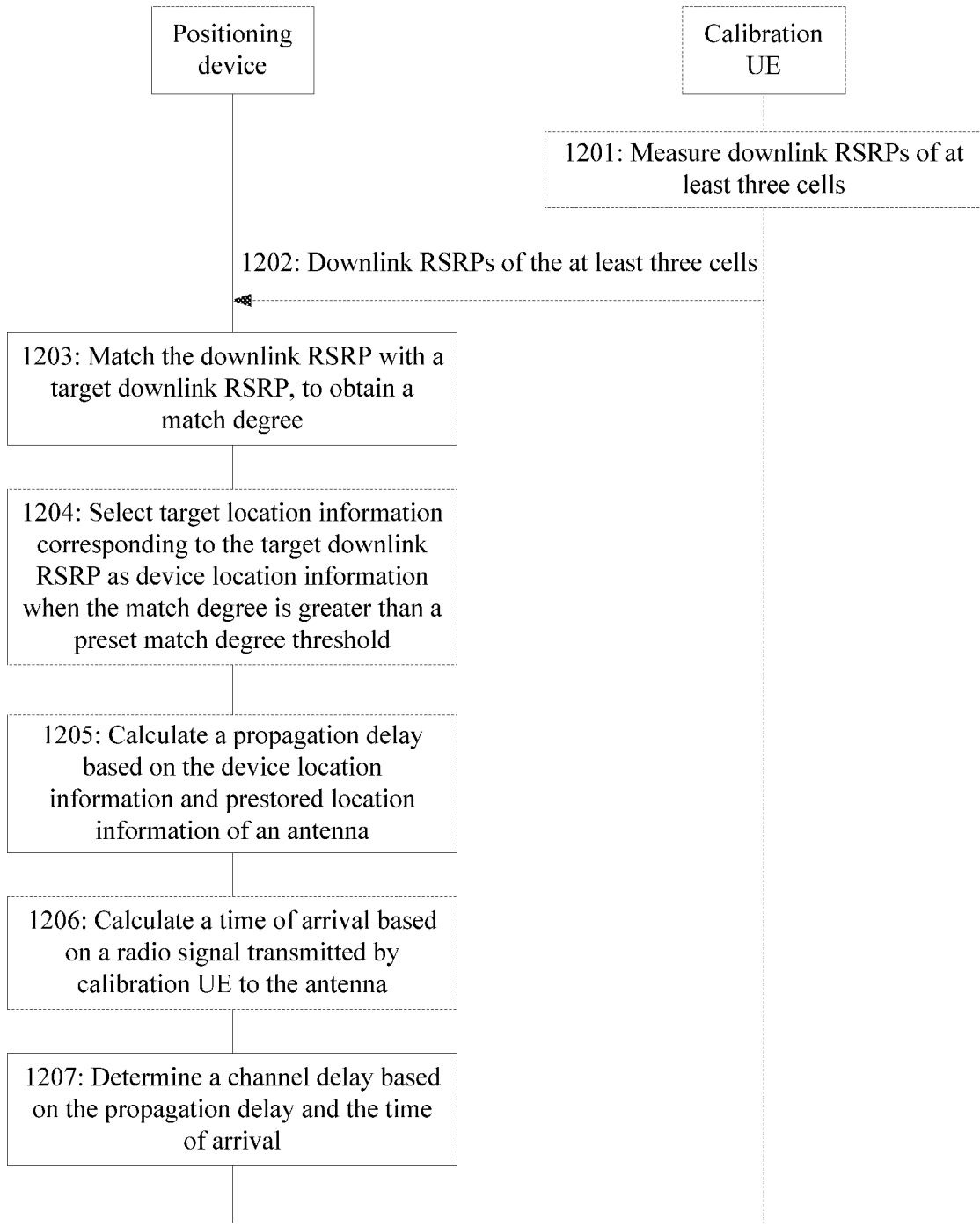
FIG. 12 is a method flowchart of a channel latency determining method according to another embodiment of the present invention.

FIG. 12 is a method flowchart of a channel latency determining method according to an embodiment of the present invention. Based on the embodiment shown in FIG. 2 and the foregoing content, in the embodiment shown in FIG. 12, the method in this embodiment of the present invention includes the following steps.

Step 1201: Calibration UE measures downlink RSRPs of at least three cells.

The downlink RSRP is a downlink reference signal received power measured by the calibration UE.

The calibration UE measures the downlink RSRPs of the at least three cells, and reports the downlink RSRPs of the cells to a positioning device. An antenna in step 1205 is an antenna of the cell.

Figure 13:
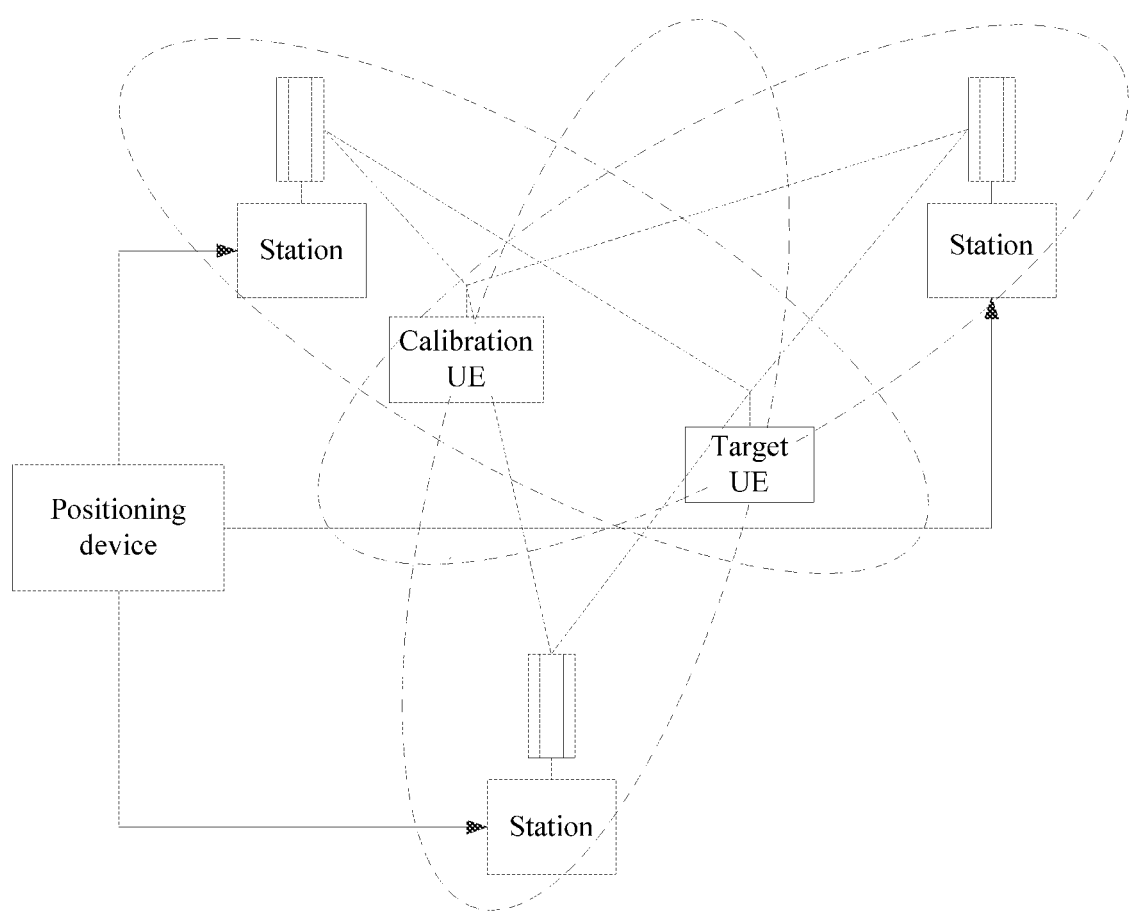
FIG. 13 is a diagram of a use scenario of the method shown in FIG. 12.

For example, FIG. 13 is a diagram of a use scenario of a manner according to an embodiment of the present invention. In the scenario diagram, three cells are included, and each cell is corresponding to an antenna of the cell. A station sends a downlink reference signal by using the antenna, so that the calibration UE can measure downlink RSRPs of different cells based on the downlink reference signal, and send the downlink RSRPs to the positioning device.

Step 1202: A positioning device obtains the downlink RSRPs of the at least three cells sent by the calibration UE.

The downlink RSRP is one of specific forms of positioning information, and the positioning device can determine device location information based on the downlink RSRP.

The downlink RSRP is the downlink reference signal received power measured by the UE. A downlink path loss is subtracted from a base station transmit power to obtain a downlink RSRP. A reference signal is a known signal that is provided by a transmit end for a receive end to perform channel estimation or sounding, and is also referred to as a pilot usually. A path loss is a loss of an average signal power between a transmitter and a receiver caused by a propagation distance and a propagation environment.

The calibration UE sends the downlink RSRPs of the at least three cells to the positioning device, so that the positioning device obtains the downlink RSRPs of the at least three cells.

Step 1203: The positioning device matches the downlink RSRP with a target downlink RSRP, to obtain a match degree.

The positioning device prestores a correspondence between the target downlink RSRP and target location information. A cell corresponding to the target downlink RSRP is the same as the cell corresponding to the downlink RSRP sent by the calibration UE. That the cells are the same includes that quantities of cells are the same.

After obtaining the downlink RSRP reported by the calibration UE, the positioning device matches the RSRP with the prestored target RSRP, to obtain the match degree, and determines, based on the match degree, whether to use the target location information corresponding to the target RSRP as the device location information.

In some embodiments of the present invention, a feature library may be pre-established on the positioning device, where the feature library prestores a plurality of correspondences between a downlink RSRP and location information. The correspondence between the target downlink RSRP and the target location information is any correspondence in the feature library. After obtaining the downlink RSRPs sent by the calibration UE, the positioning device matches downlink RSRPs in the feature library with the downlink RSRPs of the calibration UE one by one, to obtain a match degree.

The correspondence between the target downlink RSRP and the target location information may be manually entered to the positioning device. The correspondence between the target downlink RSRP and the target location information may be obtained by working personnel by using the UE to select some places for measurement, where locations of the places are target location information, and then the correspondence between the target downlink RSRP and the target location information can be established.

Step 1204: The positioning device selects target location information corresponding to the target downlink RSRP as device location information when the match degree is greater than a preset match degree threshold.

After the match degree is obtained, the positioning device determines whether the match degree is greater than the preset match degree threshold, and if the match degree is greater than the preset match degree threshold, the positioning device selects the target location information corresponding to the target downlink RSRP as the device location information of the calibration UE. If the match degree is greater than the preset match degree threshold, it indicates that the downlink RSRP sent by the calibration UE is the same as or approximates to the target downlink RSRP, and a current location of the calibration UE is the same as or near a location indicated in the target location information. Therefore, using the target location information as the device location information satisfies a precision requirement for calculating a channel latency in this embodiment of the present invention.

A setting of the preset match degree threshold may be determined by experiment or experience or through calculation. This is not specifically limited in this embodiment of the present invention.

Step 1203 and step 1204 are one of specific implementations of the determining device location information based on the positioning information by the positioning device.

Step 1205: The positioning device calculates a propagation delay based on the device location information and prestored location information of an antenna.

The propagation delay is a time from transmitting a radio signal by the calibration UE to receiving the radio signal by the antenna.

For step 1205, refer to step 202.

Step 1206: The positioning device calculates a time of arrival based on a radio signal transmitted by the calibration UE to the antenna.

The time of arrival is a time obtained through calculation according to a TOA estimation algorithm.

For step 1206, refer to step 203.

Step 1207: The positioning device determines a channel latency based on the propagation delay and the time of arrival.

The channel latency is positively correlated with the time of arrival and is negatively correlated with the propagation delay.

For step 1207, refer to step 204.

In some embodiments of the present invention, after the channel latency is obtained according to the embodiment shown in FIG. 12, the channel latency is used to obtain the location information of the UE. In other words, the positioning method shown in FIG. 4 is performed.

For example, after the channel latency $T'_{channel}$ is obtained through calculation by using the method in FIG. 12, when UE of a user is being positioned, a corresponding time of arrival $T'_{toa}$ is first obtained through calculation, and then a propagation delay $T'_{pass}$ after the channel latency is subtracted is calculated according to a preset calibration formula, where the preset calibration formula is $T'_{pass} = T'_{toa} - T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

In the embodiment shown in FIG. 12, the downlink RSRPs of the three cells corresponding to some locations of the UE are recorded in advance, and the calibration UE is positioned by using a downlink RSRP feature matching mechanism, to obtain the device location information.

In the foregoing channel latency obtaining method, the device location information of the calibration UE is used, and the channel latency is obtained based on the device location information and the location information of the antenna. In the following method, information about a distance between the calibration UE and the antenna is directly used, and the positioning device can calculate a channel latency based on the distance information.

Figure 14:
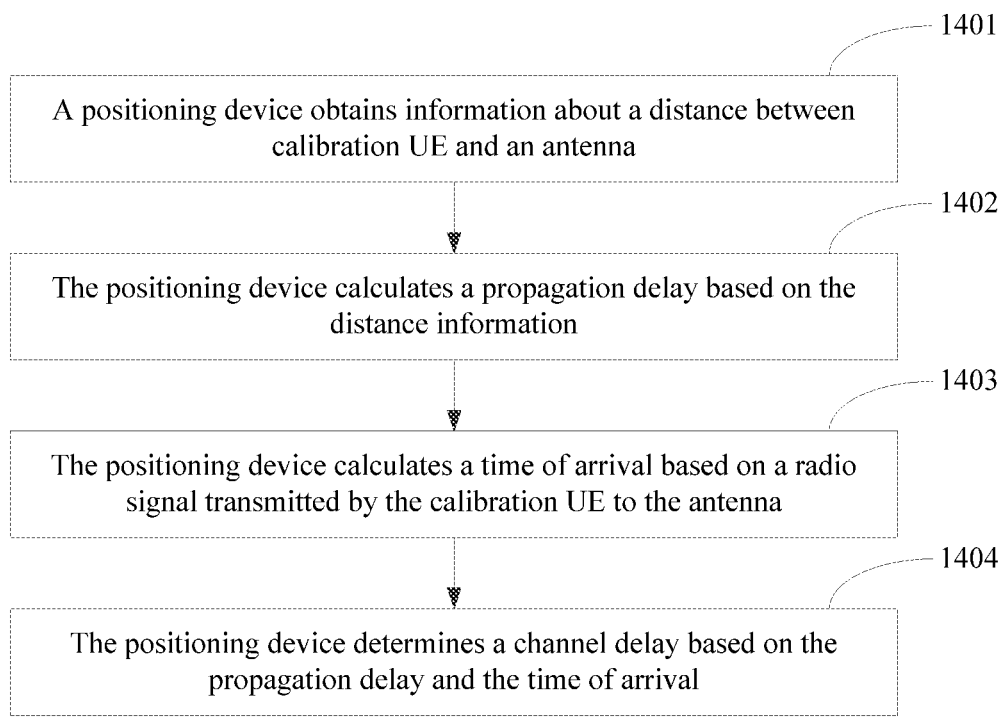
FIG. 14 is a method flowchart of a channel latency determining method according to another embodiment of the present invention.

FIG. 14 is a method flowchart of a channel latency determining method according to an embodiment of the present invention. Based on the diagram of the use scenario shown in FIG. 1 and the foregoing content, in the embodiment shown in FIG. 14, the method in this embodiment of the present invention includes the following steps.

Step 1401: A positioning device obtains information about a distance between calibration UE and an antenna.

The distance information is measured by a ranging device. The ranging device includes but is not limited to a laser rangefinder or a device having a positioning function of a GPS or a Beidou navigation satellite system.

After the ranging device measures the distance information, working personnel may send the distance information to the positioning device, or the ranging device sends the distance information to the positioning device.

In the method in this embodiment of the present invention, a manner of manually selecting a point for placing the calibration UE may be used, to calculate a channel latency. In this embodiment of the present invention, the calibration UE is not required to provide third-party measurement information of a GPS, a Beidou navigation satellite system, or the like, and the positioning device is not required to support another positioning mechanism such as an AOA mechanism.

For example, a user places the calibration UE at a location, measures a distance between the calibration UE and the antenna by using the laser rangefinder, to obtain distance information about the distance between the calibration UE and the antenna, and sends the distance information to the positioning device by using a device such as another computer.

There may be at least three antennas in this embodiment of the present invention. These antennas may belong to a same base station, or may belong to different base stations.

One base station is corresponding to a plurality of cells, the base station may include a plurality of antennas, and each cell is corresponding to an antenna of the cell. Channel latencies corresponding to antennas may be different in this embodiment of the present invention.

To improve reliability of a time of arrival obtained based on a signal of the calibration UE and facilitate distance information measurement by the positioning device, in some embodiments of the present invention, the calibration UE may be placed at a specific location. A propagation path between the calibration UE at the location and the antenna is a line-of-sight (LOS) propagation path.

Step 1402: The positioning device calculates a propagation delay based on the distance information.

The propagation delay is a time from transmitting a radio signal by the calibration UE to receiving the radio signal by the antenna.

After obtaining the distance information, the positioning device can obtain the propagation delay through calculation based on the distance information.

A specific manner of calculating the propagation delay may be that the positioning device divides the information about the distance between the calibration UE and the antenna by a propagation speed of the radio signal, to obtain the propagation delay required by the signal transmitted by the calibration UE to arrive at the antenna. The propagation speed of the radio signal may be a precise speed, or may be data satisfying preset precision. For example, the propagation speed may be a light speed of 0.3 m/ns.

Step 1403: The positioning device calculates a time of arrival based on a radio signal transmitted by the calibration UE to the antenna.

The time of arrival is a time obtained through calculation according to a TOA estimation algorithm.

For step 1403, refer to step 203.

Step 1404: The positioning device determines a channel latency based on the propagation delay and the time of arrival.

The channel latency is positively correlated with the time of arrival and is negatively correlated with the propagation delay.

There are a plurality of specific methods for determining a channel latency based on the propagation delay and the time of arrival by the positioning device. For example, the positioning device determines the channel latency based on the propagation delay and the time of arrival by using a first preset formula.

In the first preset formula, the channel latency is positively correlated with the time of arrival and is negatively correlated with the propagation delay.

Optionally, the first preset formula is $T_{channel}=T_{toa}-T_{pass}$. $T_{pass}$ represents a propagation delay, $T_{toa}$ represents a time of arrival, and $T_{channel}$ represents a channel latency.

For step 1404, refer to step 204.

In some embodiments of the present invention, after the channel latency is obtained according to the embodiment shown in FIG. 14, the channel latency is used to obtain the location information of the UE. In other words, the positioning method shown in FIG. 4 is performed.

For example, after the channel latency $T'_{channel}$ is obtained through calculation by using the method in FIG. 14, when UE of a user is being positioned, a corresponding time of arrival $T'_{doa}$ is first obtained through calculation, and then a propagation delay $T'_{pass}$ after the channel latency is subtracted is calculated according to a preset calibration formula, where the preset calibration formula is $T'_{pass}=T'_{toa}-T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

In summary, after obtaining the information about the distance between the calibration UE and the antenna, the positioning device calculates the propagation delay based on the distance information, where the distance information is obtained through measurement by the ranging device, and the propagation delay is the time from transmitting the radio signal by the calibration UE to receiving the radio signal by the antenna, the positioning device calculates the time of arrival based on the radio signal transmitted by the calibration UE to the antenna, where the time of arrival is the time obtained through calculation according to the TOA estimation algorithm, and the positioning device calculates the channel latency based on the propagation delay and the time of arrival, where the channel latency is positively correlated with the time of arrival and is negatively correlated with the propagation delay. In this way, the positioning device can obtain the propagation delay based on the device location information of the calibration UE and the location information of the antenna, and obtain the channel latency based on the propagation delay and the time of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

Figure 19:
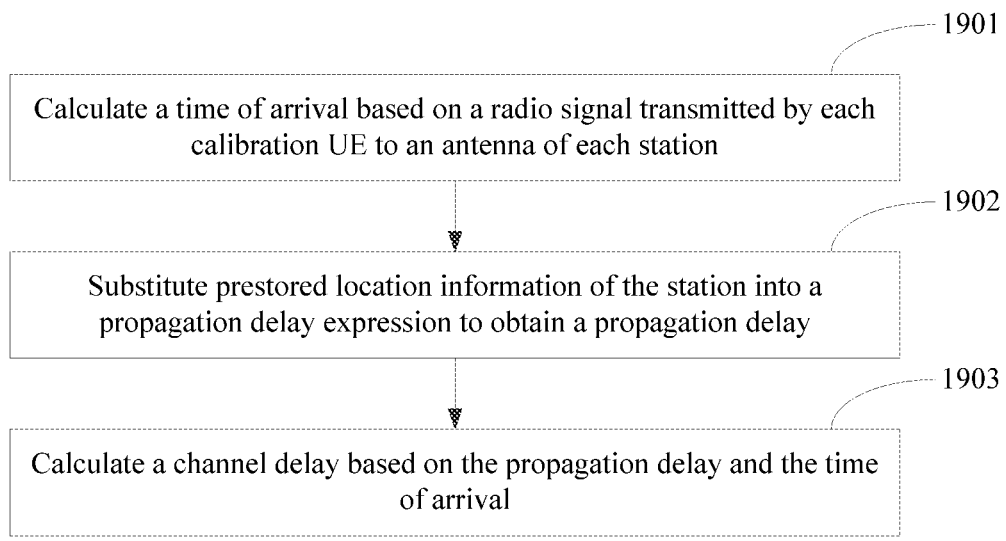
FIG. 19 is a method flowchart of a channel latency determining method according to another embodiment of the present invention.

FIG. 19 is a method flowchart of a channel latency determining method according to an embodiment of the present invention. For a use scenario in the embodiment shown in FIG. 19, refer to a diagram of a use scenario shown in FIG. 20.

Figure 20:
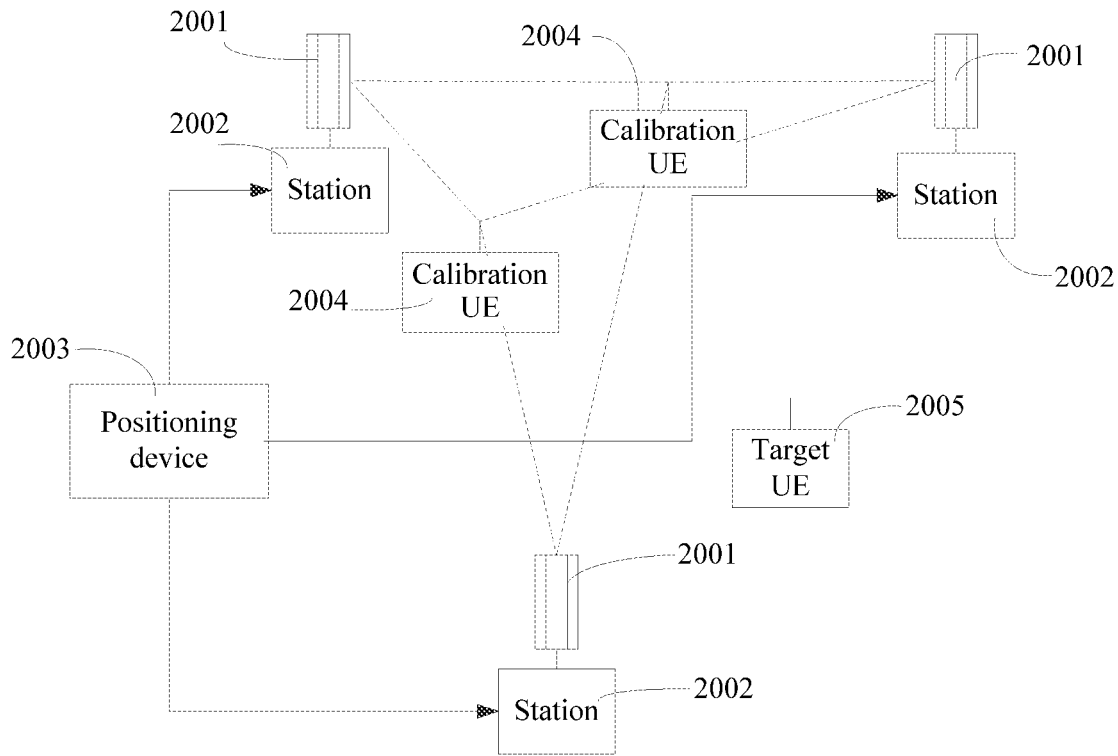
FIG. 20 is a diagram of a use scenario of the method in the embodiment shown in FIG. 19.

As shown in FIG. 20, a positioning device 2003, UE, and a station 2002 connected to the positioning device 2003 are included in the use scenario. An antenna 2001 of the station 2002 may obtain a radio signal transmitted by the UE, to calculate location information of the UE based on the radio signal. In this embodiment of the present invention, to increase positioning precision, a channel latency of the station needs to be calculated first. UE used for calculating the channel latency is referred to as calibration UE 2004, and the calibration UE 2004 may be common UE used by a user. In this embodiment of the present invention, there are a plurality of stations, for example, more than four stations, and there are a plurality of calibration UEs, for example, more than two calibration UEs. The positioning device can still obtain the channel latency of the station through calculation without knowing the device location information of the calibration UE. After the channel latency of the station is obtained through calculation, the channel latency can be subtracted from a time of arrival when target UE 2005 is being positioned by using a TOA/TDOA mechanism-based positioning method. This can increase positioning precision in a positioning mechanism affected by the channel latency.

Referring to FIG. 19, the method in this embodiment of the present invention includes the following steps.

Step 1901: The positioning device calculates a time of arrival based on a radio signal transmitted by each calibration UE to an antenna of each station.

The time of arrival is a time obtained through calculation according to a TOA estimation algorithm.

In this embodiment of the present invention, there are M stations and N calibration UEs participating in calculation, where M and N are positive integers greater than 0, and $M \times N \geq 2 \times N + M + N - 1$.

Each calibration UE transmits a radio signal, and the antenna of each station receives the radio signal. The positioning device connected to the stations obtains a plurality of times of arrival through calculation based on the radio signal. The antennas receiving the radio signal may form an antenna array, and a quantity of antennas may be one, two, four, eight, or the like.

For example, $i^{th}$ UE transmits a radio signal, and the radio signal is received by an antenna of a $j^{th}$ station, so that the positioning device connected to the station obtains a time of arrival $T_{toa}^{i,j}$ through calculation based on the radio signal by using the TOA estimation algorithm, where i and j are natural numbers.

In some embodiments of the present invention, to ensure that a quantity of stations and a quantity of calibration UEs satisfy requirements, the quantity of stations and the quantity of calibration UEs need to be further detected in the method in this embodiment of the present invention, to make $M \times N \geq 2 \times N + M + N - 1$. If the condition is not satisfied, a time of arrival and the like need to be further calculated, until the condition is satisfied.

In some embodiments of the present invention, to make the time of arrival obtained through calculation more reliable and make calculation results of the time of arrival and the channel latency satisfy preset accuracy, the positioning device further needs to calculate time-of-arrival confidence levels of times of arrival, and select a time of arrival whose time-of-arrival confidence level is greater than a preset threshold, for subsequent calculation of the channel latency, so as to perform channel calibration. In this way, when both the foregoing quantity condition and confidence level condition are satisfied, that is, when M×N≥2×N+M+N−1 and the time-of-arrival confidence levels of the times of arrival obtained by the positioning device through calculation are greater than the preset threshold, subsequent steps of the method in this embodiment of the present invention are performed, otherwise, the foregoing step is repeated until the two conditions are satisfied.

Step 1902: The positioning device substitutes prestored location information of the station into a propagation delay expression to obtain a propagation delay.

The propagation delay expression includes the device location information of the calibration UE, and the device location information is an unknown number. The propagation delay is a time during which a radio signal transmitted by the calibration UE is propagated over an air interface before the radio signal arrives at the antenna, that is, the propagation delay is a time from transmitting the radio signal by the calibration UE to receiving the radio signal by the antenna.

The positioning device prestores the location information of the station, and the positioning device substitutes the location information of the station used in step 1902 into the propagation delay expression to obtain the propagation delay. The propagation delay may not be a determined value and includes the device location information of the calibration UE, but the device location information is an unknown number.

The propagation delay expression has a plurality of specific forms, for example, $T_{pass}=\text{sqrt}((eNb\_x^j-Ue\_x^i)^2+(eNb\_y^j-Ue\_y^i)^2)/c$.

$(eNb\_x^j, eNb\_y^j)$ represents location information of a $j^{th}$ station, $(Ue\_x^i, Ue\_y^i)$ represents device location information of $i^{th}$ calibration UE, c represents a propagation speed of a radio signal, $T_{pass}$ represents a propagation delay, $T_{pass}$ may specifically represent a time during which a radio signal transmitted by the $i^{th}$ calibration UE is propagated over an air interface before the radio signal arrives at an antenna of the $j^{th}$ station, sqrt represents a square root function, and i and j are natural numbers. The propagation speed of the radio signal may be, for example, a light speed.

Step 1903: The positioning device calculates a channel latency based on the propagation delay and the time of arrival.

The channel latency is positively correlated with the time of arrival and is negatively correlated with the propagation delay, the channel latency is negatively correlated with a delay adjustment value, and the delay adjustment value is an unknown number.

There are a plurality of implementations of calculating a channel latency based on the propagation delay and the time of arrival. For example, the channel latency is calculated based on the propagation delay and the time of arrival by using a second preset formula. The positioning device substitutes a plurality of obtained propagation delays and a plurality of obtained times of arrival into the second preset formula, to obtain a plurality of equations, unites the plurality of equations to obtain sets of equations, and calculates the sets of equations to obtain channel latencies.

The second preset formula includes a channel latency, a time of arrival, and a propagation delay. In the second preset formula, the channel latency is positively correlated with the time of arrival and is negatively correlated with the propagation delay. The second preset formula further includes a delay adjustment value of the calibration UE, the channel latency is negatively correlated with the delay adjustment value, and the delay adjustment value is an unknown number.

The second preset formula has a plurality of forms, and a form of the second preset formula is not specifically limited in this embodiment of the present invention. For example, the second preset formula may be $T_{toa}^{i,j}=T^j_{channel}+T_{pass}+TA^i$. After the time of arrival and the propagation delay expression $T_{pass}=\text{sqrt}((eNb\_x^j-Ue\_x^i)^2+(eNb\_y^j-Ue\_y^i)^2)/c$ are substituted into the second preset formula, the second preset formula may be: $T_{toa}^{i,j}=T^j_{channel}+\text{sqrt}((eNb\_x^j-Ue\_x^i)^2+(eNb\_y^j-Ue\_y^i)^2)/c+TA^i$, where $T_{toa}^{i,j}$ represents a time of arrival of a radio signal from $i^{th}$ calibration UE to an antenna of a $j^{th}$ station, $T^j_{channel}$ represents a channel latency of the $j^{th}$ station, $(eNb\_x^j, eNb\_y^j)$ represents location information of the $j^{th}$ station, $(Ue\_x^i, Ue\_y^i)$ represents device location information of the $i^{th}$ calibration UE, c represents a propagation speed of the radio signal, $T_{pass}$ represents a propagation delay, $TA^i$ represents a delay adjustment value of the $i^{th}$ calibration UE, sqrt represents a square root function, and i and j are natural numbers.

The second preset formula may unite with (M×N) equations based on the quantity M of stations and the quantity N of calibration UEs. United sets of equations have (2×N+M+N) unknown numbers that are respectively corresponding to location coordinates of N UEs, channel latencies of M stations, and delay adjustment values of the N UEs. The channel latencies of the stations can be obtained through calculation, provided that the condition M×N≥2×N+M+N−1 is satisfied.

In some embodiments of the present invention, the location information of the calibration UE may be further obtained through calculation according to the second preset formula. For example, coordinate information of the calibration UE may be obtained through calculation according to the foregoing second preset formula $T_{toa}^{i,j}=T^j_{channel}+\text{sqrt}((eNb\_x^j-Ue\_x^i)^2+(eNb\_y^j-Ue\_y^i)^2)/c+TA^i$.

In some embodiments of the present invention, after the channel latency is obtained according to the embodiment shown in FIG. 19, the channel latency can be used to obtain the location information of the UE. In other words, the positioning method shown in FIG. 4 is performed. For details, refer to the embodiment shown in FIG. 4.

For example, after the channel latency $T'_{channel}$ is obtained through calculation by using the method in FIG. 19, when UE of a user is being positioned, a corresponding time of arrival $T'_{toa}$ is first obtained through calculation, and then a propagation delay $T'_{pass}$ after the channel latency is subtracted is calculated according to a preset calibration formula, where the preset calibration formula is $T'_{pass}=T'_{toa}-T'_{channel}$.

Then, a location of the UE is calculated based on the obtained propagation delay $T'_{pass}$ excluding the channel latency and by using a TOA/TDOA mechanism. Because the channel latency is subtracted for the location of the UE obtained in this way, precision of the location information is increased, and a result of the location information is more accurate.

In summary, the time of arrival is calculated based on the radio signal transmitted by each calibration UE to the antenna of each station, where the time of arrival is the time obtained through calculation according to the TOA estimation algorithm, there are M stations and N calibration UEs, M and N are positive integers greater than 0, and M×N≥2×

N+M+N−1, the prestored location information of the station is substituted into the propagation delay expression to obtain the propagation delay, where the propagation delay expression includes the device location information of the calibration UE, the device location information is an unknown number, and the propagation delay is the time from transmitting the radio signal by the calibration UE to receiving the radio signal by the antenna, and the positioning device calculates the channel latency based on the propagation delay and the time of arrival, where the channel latency is positively correlated with the time of arrival and is negatively correlated with the propagation delay, the channel latency is negatively correlated with the delay adjustment value, and the delay adjustment value is an unknown number. In this way, after substituting the location information of the station into the propagation delay expression, the positioning device obtains the propagation delay represented by using the location information of the station and the device location information of the calibration UE, and can obtain channel latencies based on a plurality of propagation delays and a plurality of times of arrival. Therefore, in this embodiment of the present invention, the channel latency can be accurately measured, and during a process of positioning another UE by using the TOA/TDOA mechanism-based positioning method, the channel latency can be subtracted from the time of arrival. This increases positioning precision in a positioning mechanism affected by the channel latency.

Figure 15:
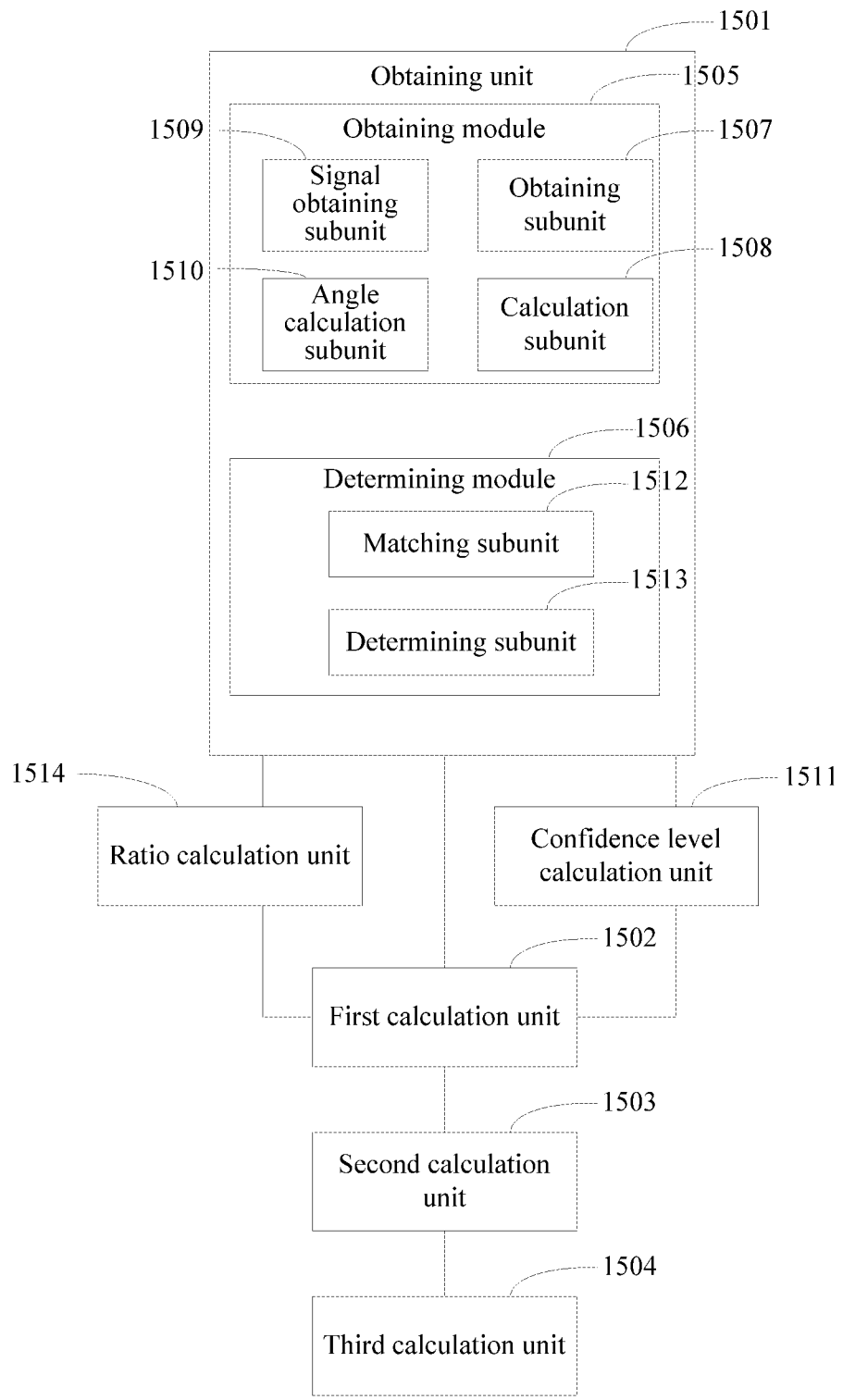
FIG. 15 is a schematic structural diagram of a communications device according to another embodiment of the present invention.

FIG. 15 is a schematic structural diagram of a communications device according to an embodiment of the present invention. The communications device shown in FIG. 15 may be configured to perform the channel latency determining methods in the embodiments shown in FIG. 2, FIG. 5, FIG. 6, FIG. 8, FIG. 10, and FIG. 12. Referring to FIG. 15, the communications device in this embodiment of the present invention includes an obtaining unit 1501, configured to obtain device location information of calibration UE, a first calculation unit 1502, configured to calculate a propagation delay based on the device location information and prestored location information of an antenna, where the propagation delay is a time from transmitting a radio signal by the calibration UE to receiving the radio signal by the antenna, a second calculation unit 1503, configured to calculate a time of arrival based on the radio signal transmitted by the calibration UE to the antenna, where the time of arrival is a time obtained through calculation according to a TOA estimation algorithm, and a third calculation unit 1504, configured to determine a channel latency based on the propagation delay and the time of arrival, where the channel latency is positively correlated with the time of arrival and is negatively correlated with the propagation delay.

Optionally, the obtaining unit 1501 includes an obtaining module 1505, configured to obtain positioning information of the calibration UE, and a determining module 1506, configured to determine the device location information based on the positioning information.

Optionally, the determining module 1506 is further configured to determine prestored reference location information of a reference object as the device location information when the positioning information satisfies a preset adjacency condition.

Optionally, the obtaining module 1505 includes an obtaining subunit 1507, configured to obtain the radio signal transmitted by the calibration UE to at least three antennas, and a calculation subunit 1508, configured to calculate, based on the radio signal, an RSRP of a signal obtained by each antenna, and the determining module 1506 is further configured to determine prestored location information of a target antenna as the device location information when an RSRP of a signal obtained by the target antenna is greater than an RSRP of a signal obtained by any other antenna and a difference between the two RSRPs is a preset signal threshold, where the target antenna and the any other antenna are antennas in the at least three antennas.

Optionally, the obtaining module 1505 is further configured to obtain neighboring cell measurement information sent by the calibration UE, where the neighboring cell measurement information is obtained through calculation by the calibration UE based on downlink common channel information sent by a reference node, and the communications device prestores location information of the reference node, and the determining module 1506 is further configured to select, for the communications device, the prestored location information of the reference node as the device location information when the neighboring cell measurement information is greater than a preset neighboring cell threshold.

Optionally, the obtaining module 1505 includes a signal obtaining subunit 1509, configured to obtain the radio signal transmitted by the calibration UE to the antenna, and an angle calculation subunit 1510, configured to calculate an angle at which the radio signal arrives at the antenna, and the determining module 1506 is further configured to calculate the device location information based on the angle by using an AOA mechanism.

Optionally, the communications device further includes a confidence level calculation unit 1511, configured to calculate a confidence level of the device location information based on the signal of the calibration UE, and the first calculation unit 1502 is further configured to when the confidence level is greater than a preset confidence level threshold, perform the step of calculating a propagation delay based on the device location information and prestored location information of an antenna.

Optionally, the obtaining module 1505 is further configured to obtain downlink RSRPs of at least three cells sent by the calibration UE, where the downlink RSRP is a downlink reference signal received power measured by the calibration UE, and the antenna is an antenna of the cell, and the determining module 1506 further includes a matching subunit 1512, configured to match the downlink RSRP with a target downlink RSRP, to obtain a match degree, and a determining subunit 1513, configured to select, for the communications device, target location information corresponding to the target downlink RSRP as the device location information when the match degree is greater than a preset match degree threshold, where the communications device prestores a correspondence between the target downlink RSRP and the target location information.

Optionally, the obtaining unit 1501 is further configured to obtain the device location information sent by the calibration UE, where the device location information is obtained by the calibration UE by using a positioning module disposed on the calibration UE.

Optionally, the communications device further includes a ratio calculation unit 1514, configured to calculate a signal-power-to-noise-power ratio SNS based on the radio signal transmitted by the calibration UE, and the first calculation unit 1502 is further configured to when the SNS is greater than a preset SNS threshold, perform the step of calculating a propagation delay based on the device location information and prestored location information of an antenna.

Optionally, the obtaining unit 1501 is further configured to obtain the device location information of the calibration UE sent by a positioning apparatus.

Optionally, the third calculation unit 1504 is further configured to determine the channel latency based on the propagation delay and the time of arrival by using a first preset formula, where the first preset formula is $T_{channel} = T_{toa} - T_{pass}$, where $T_{pass}$ represents a propagation delay, $T_{toa}$ represents a time of arrival, and $T_{channel}$ represents a channel latency.

In summary, after the obtaining unit 1501 obtains the device location information of the calibration UE, the first calculation unit 1502 calculates the propagation delay based on the device location information and the prestored location information of the antenna, where the propagation delay is the time from transmitting the radio signal by the calibration UE to receiving the radio signal by the antenna, the second calculation unit 1503 calculates the time of arrival based on the radio signal transmitted by the calibration UE to the antenna, where the time of arrival is the time obtained through calculation according to the TOA estimation algorithm, and the third calculation unit 1504 is configured to calculate the channel latency based on the propagation delay and the time of arrival, where the channel latency is positively correlated with the time of arrival and is negatively correlated with the propagation delay. In this way, the communications device can obtain the propagation delay based on the device location information of the calibration UE and the location information of the antenna, and obtain the channel latency based on the propagation delay and the time of arrival. There are a plurality of manners of obtaining the device location information. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

Figure 16:
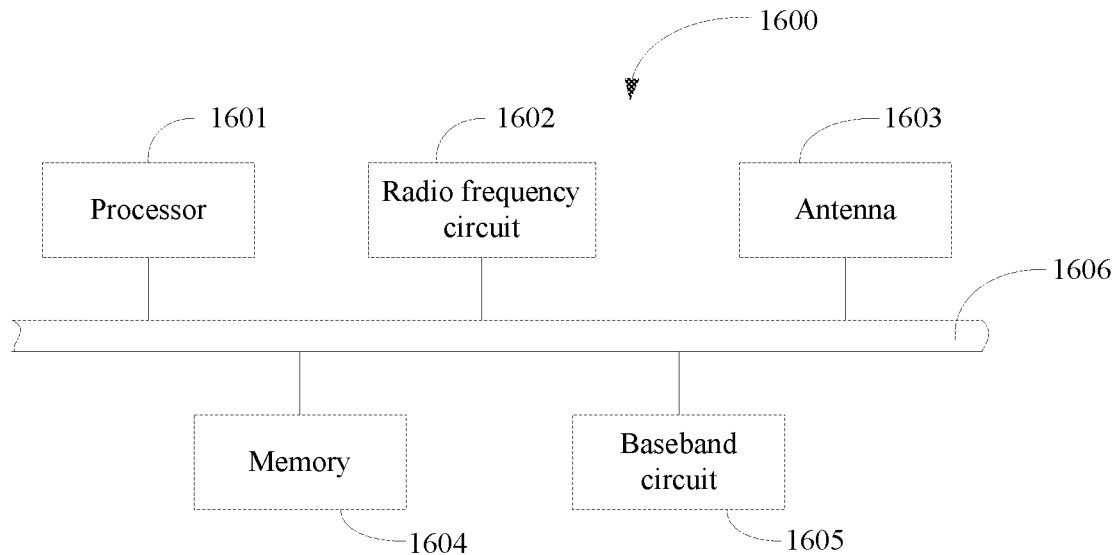
FIG. 16 is a schematic diagram of a hardware structure of a communications device according to another embodiment of the present invention.

For details, refer to FIG. 16. FIG. 16 shows another embodiment of a communications device according to an embodiment of the present invention. Specifically, the communications device 1600 may vary relatively greatly due to different configurations or performance, and may include at least one processor (CPU) 1601 (for example, at least one processor), a memory 1604, a baseband circuit 1605, a radio frequency circuit 1602, and an antenna 1603. These components may perform communication through a bus 16o6.

The memory 1604 may be temporary storage or persistent storage. A program stored in the memory 1604 may include at least one module (not shown in the figure), where each module may include a series of instruction operations for the communications device. Further, the processor 1601 may be set to communicate with the memory 1604, and perform, on the communications device 1600, the series of instruction operations in the memory 1604.

Steps performed by the communications device in the embodiments shown in FIG. 2, FIG. 5, FIG. 6, FIG. 8, FIG. 10, and FIG. 12 may be based on a hardware structure of the communications device shown in FIG. 16. An apparatus structure of the communications device shown in FIG. 15 may be integrated on the hardware structure of the communications device in this embodiment of the present invention.

Specific cases are as follows.

The processor 1601 has the following functions: obtaining device location information of calibration UE, calculating a propagation delay based on the device location information and prestored location information of an antenna, where the propagation delay is a time from transmitting a radio signal by the calibration UE to receiving the radio signal by the antenna, calculating a time of arrival based on the radio signal transmitted by the calibration UE to the antenna, where the time of arrival is a time obtained through calculation according to a TOA estimation algorithm, and determining a channel latency based on the propagation delay and the time of arrival, where the channel latency is positively correlated with the time of arrival and is negatively correlated with the propagation delay.

Optionally, the processor 1601 further has the following specific functions: obtaining positioning information of the calibration UE, and determining the device location information based on the positioning information.

Optionally, the processor 1601 further has the function of determining prestored reference location information of a reference object as the device location information when the positioning information satisfies a preset adjacency condition.

Optionally, the processor 1601 further has the following specific functions: obtaining the radio signal transmitted by the calibration UE to at least three antennas, calculating an RSRP of a signal obtained by each antenna, and determining prestored location information of a target antenna as the device location information when an RSRP of a signal obtained by the target antenna is greater than an RSRP of a signal obtained by any other antenna and a difference between the two RSRPs is a preset signal threshold, where the target antenna and the any other antenna are antennas in the at least three antennas.

Optionally, the processor 1601 further has the following specific functions: obtaining neighboring cell measurement information sent by the calibration UE, where the neighboring cell measurement information is obtained through calculation by the calibration UE based on downlink common channel information sent by a reference node, and the communications device prestores location information of the reference node, and selecting the prestored location information of the reference node as the device location information when the neighboring cell measurement information is greater than a preset neighboring cell threshold.

Optionally, the processor 1601 further has the following specific functions: obtaining the radio signal transmitted by the calibration UE to the antenna, calculating an angle at which the radio signal arrives at the antenna, and calculating the device location information based on the angle by using an AOA mechanism.

Optionally, the processor 1601 further has the following specific functions: calculating a confidence level of the device location information based on the signal of the calibration UE, and when the confidence level is greater than a preset confidence level threshold, performing the step of calculating a propagation delay based on the device location information and prestored location information of an antenna.

Optionally, the processor 1601 further has the following specific functions: obtaining downlink RSRPs of at least three cells sent by the calibration UE, where the downlink RSRP is a downlink reference signal received power measured by the calibration UE, and the antenna is an antenna of the cell, matching the downlink RSRP with a target downlink RSRP, to obtain a match degree, and selecting target location information corresponding to the target downlink RSRP as the device location information when the match degree is greater than a preset match degree threshold, where the communications device prestores a correspondence between the target downlink RSRP and the target location information.

Optionally, the processor 1601 further has the following specific function: obtaining the device location information sent by the calibration UE, where the device location information is obtained by the calibration UE by using a positioning module disposed on the calibration UE.

Optionally, the processor 1601 further has the following specific functions: calculating a signal-power-to-noise-power ratio SNS based on the radio signal transmitted by the calibration UE, and when the SNS is greater than a preset SNS threshold, performing the step of calculating a propagation delay based on the device location information and prestored location information of an antenna.

Optionally, the processor 1601 further has the following specific function: obtaining the device location information of the calibration UE sent by a positioning apparatus.

Optionally, the processor 1601 further has the following specific function: determining the channel latency based on the propagation delay and the time of arrival by using a first preset formula.

In summary, after the processor 1601 obtains the device location information of the calibration UE, the processor 1601 calculates the propagation delay based on the device location information and the prestored location information of the antenna, where the propagation delay is the time from transmitting the radio signal by the calibration UE to receiving the radio signal by the antenna, the processor 1601 calculates the time of arrival based on the radio signal transmitted by the calibration UE to the antenna, where the time of arrival is the time obtained through calculation according to the TOA estimation algorithm, and the processor 1601 calculates the channel latency based on the propagation delay and the time of arrival, where the channel latency is positively correlated with the time of arrival and is negatively correlated with the propagation delay. In this way, the communications device can obtain the propagation delay based on the device location information of the calibration UE and the location information of the antenna, and obtain the channel latency based on the propagation delay and the time of arrival. There are a plurality of manners of obtaining the device location information. Therefore, in this embodiment of the present invention, the channel latency can be accurately measured, and in a TOA/TDOA mechanism-based positioning method, the channel latency can be subtracted from the time of arrival. This can increase positioning precision in a positioning mechanism affected by the channel latency.

Figure 17:
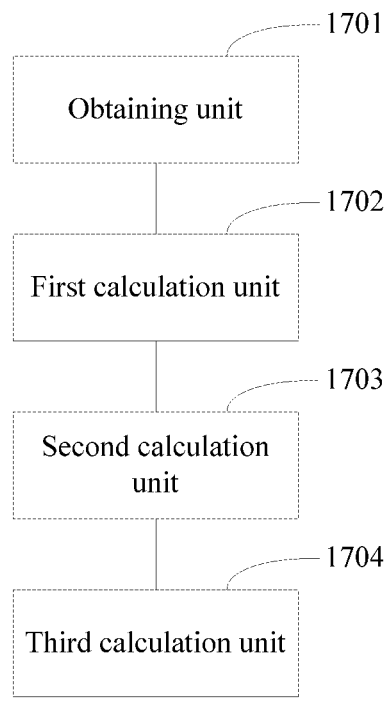
FIG. 17 is a schematic structural diagram of a communications device according to another embodiment of the present invention.

FIG. 17 is a schematic structural diagram of a communications device according to an embodiment of the present invention. The communications device shown in FIG. 17 may be configured to perform the channel latency determining method shown in FIG. 14. Referring to FIG. 17, the communications device in this embodiment of the present invention includes: an obtaining unit 1701, configured to obtain information about a distance between calibration UE and an antenna, where the distance information is obtained through measurement by a ranging device, a first calculation unit 1702, configured to calculate a propagation delay based on the distance information, where the propagation delay is a time from transmitting a radio signal by the calibration UE to receiving the radio signal by the antenna, a second calculation unit 1703, configured to calculate a time of arrival based on the radio signal transmitted by the calibration UE to the antenna, where the time of arrival is a time obtained through calculation according to a TOA estimation algorithm, and a third calculation unit 1704, configured to determine a channel latency based on the propagation delay and the time of arrival, where the channel latency is positively correlated with the time of arrival and is negatively correlated with the propagation delay.

Optionally, a propagation path between the calibration UE and the antenna is a LOS propagation path.

Optionally, a first preset formula is $T_{channel} = T_{toa} - T_{pass}$, where $T_{pass}$ represents a propagation delay, $T_{toa}$ represents a time of arrival, and $T_{channel}$ represents a channel latency.

In summary, after the obtaining unit 1701 obtains the information about the distance between the calibration UE and the antenna, the first calculation unit 1702 calculates the propagation delay based on the distance information, where the distance information is obtained through measurement by the ranging device, and the propagation delay is the time from transmitting the radio signal by the calibration UE to receiving the radio signal by the antenna, the second calculation unit 1703 calculates the time of arrival based on the radio signal transmitted by the calibration UE to the antenna, where the time of arrival is the time obtained through calculation according to the TOA estimation algorithm, and the third calculation unit 1704 calculates the channel latency based on the propagation delay and the time of arrival, where the channel latency is positively correlated with the time of arrival and is negatively correlated with the propagation delay. In this way, the communications device can obtain the propagation delay based on device location information of the calibration UE and location information of the antenna, and obtain the channel latency based on the propagation delay and the time of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

An embodiment of the present invention further provides a communications device. For details, refer to FIG. 16. The communications device also has a hardware structure similar to that of the communications device shown in FIG. 16. In the another embodiment of the communications device according to an embodiment of the present invention, specifically, the communications device may vary relatively greatly due to different configurations or performance, and may include at least one processor (CPU) (for example, at least one processor), a memory, a baseband circuit, a radio frequency circuit, and an antenna. These components may perform communication through a bus.

The memory may be temporary storage or persistent storage. A program stored in the memory may include at least one module (not shown in the figure), where each module may include a series of instruction operations for the communications device. Further, the processor may be set to communicate with the memory, and perform, on the communications device, the series of instruction operations in the memory.

Steps performed by the communications device in the embodiment shown in FIG. 14 may be based on the hardware structure of the communications device in this embodiment of the present invention. An apparatus structure of the communications device shown in FIG. 17 may be integrated on the hardware structure of the communications device in this embodiment of the present invention.

Specific cases are as follows:

The processor has the following functions: obtaining information about a distance between calibration UE and an antenna, where the distance information is obtained through measurement by a ranging device, calculating a propagation delay based on the distance information, where the propagation delay is a time from transmitting a radio signal by the calibration UE to receiving the radio signal by the antenna, calculating a time of arrival based on the radio signal transmitted by the calibration UE to the antenna, where the time of arrival is the time obtained through calculation according to the TOA estimation algorithm, and determining a channel latency based on the propagation delay and the time of arrival, where the channel latency is positively correlated with the time of arrival and is negatively correlated with the propagation delay.

Optionally, a propagation path between the calibration UE and the antenna is a LOS propagation path.

Optionally, the processor further has the following specific function: determining the channel latency based on the propagation delay and the time of arrival by using a first preset formula.

In summary, after obtaining the information about the distance between the calibration UE and the antenna, the processor calculates the propagation delay based on the distance information, where the distance information is obtained through measurement by the ranging device, and the propagation delay is the time from transmitting the radio signal by the calibration UE to receiving the radio signal by the antenna, the processor calculates the time of arrival based on the radio signal transmitted by the calibration UE to the antenna, where the time of arrival is the time obtained through calculation according to the TOA estimation algorithm, and the processor calculates the channel latency based on the propagation delay and the time of arrival, where the channel latency is positively correlated with the time of arrival and is negatively correlated with the propagation delay. In this way, the communications device can obtain the propagation delay based on device location information of the calibration UE and location information of the antenna, and obtain the channel latency based on the propagation delay and the time of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

Figure 18:
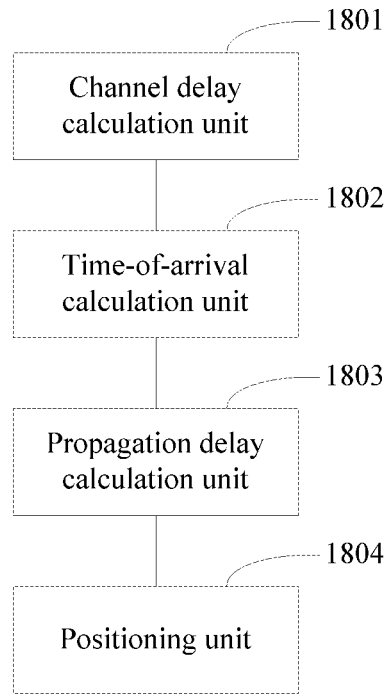
FIG. 18 is a schematic structural diagram of a positioning device according to another embodiment of the present invention.

FIG. 18 is a schematic structural diagram of a positioning device according to an embodiment of the present invention. The positioning device shown in FIG. 18 may be configured to perform the positioning method in the embodiment shown in FIG. 4. Referring to FIG. 18, the positioning device in this embodiment of the present invention includes: a channel latency calculation unit 1801, configured to determine a channel latency $T'_{channel}$, where the channel latency includes a time for processing data inside a station and a radio frequency transmission time, a time-of-arrival calculation unit 1802, configured to calculate a time of arrival $T'_{toa}$ based on a radio signal transmitted by target UE to an antenna, where the antenna belongs to the base station, a propagation delay calculation unit 1803, configured to calculate a propagation delay $T'_{pass}$ according to a preset calibration formula, where the preset calibration formula is $T'_{pass}=T'_{toa}-T'_{channel}$, and a positioning unit 1804, configured to calculate location information of the target UE based on the propagation delay by using a TOA/TDOA mechanism, where the channel latency calculation unit includes apparatuses included in the communications device according to any one of embodiments shown in FIG. 15, FIG. 17, and FIG. 21.

In summary, after the channel latency calculation unit 1801 determines the channel latency $T'_{channel}$, the time-of-arrival calculation unit 1802 calculates the time of arrival $T'_{doa}$ based on the radio signal transmitted by the target UE to the antenna, the propagation delay calculation unit 1803 calculates the propagation delay $T'_{pass}$ according to the preset calibration formula, where the preset calibration formula is $T'_{pass}=T'_{toa}-T'_{channel}$, and the positioning unit 1804 calculates the location information of the target UE based on the propagation delay by using the TOA/TDOA mechanism. Because the propagation delay is unrelated to a channel on the base station side and is not affected by the channel latency, the obtained location information of the target UE is not affected by a difference between channels of different stations. This increases positioning precision in the positioning method in this embodiment of the present invention.

An embodiment of the present invention further provides a positioning device. For details, refer to FIG. 16. The positioning device also has a hardware structure similar to that of the communications device shown in FIG. 16. In the another embodiment of the positioning device according to an embodiment of the present invention, specifically, the positioning device may vary relatively greatly due to different configurations or performance, and may include at least one processor (CPU) (for example, at least one processor), a memory, a baseband circuit, a radio frequency circuit, and an antenna. These components may perform communication through a bus.

The memory may be temporary storage or persistent storage. A program stored in the memory may include at least one module (not shown in the figure), where each module may include a series of instruction operations for the positioning device. Further, the processor may be set to communicate with the memory, and perform, on the positioning device, the series of instruction operations in the memory.

Steps performed by the positioning device in the embodiment shown in FIG. 4 may be based on the hardware structure of the positioning device in this embodiment of the present invention. An apparatus structure of the positioning device shown in FIG. 18 may be integrated on the hardware structure of the positioning device in this embodiment of the present invention.

Specific cases are as follows:

The processor has the following functions: determining a channel latency $T'_{channel}$, where the channel latency includes a time for processing data inside a station and a radio frequency transmission time, calculating a time of arrival $T'_{doa}$ based on a radio signal transmitted by target UE to an antenna, where the antenna belongs to the base station, calculating a propagation delay $T'_{pass}$ according to a preset calibration formula, where the preset calibration formula is $T'_{pass}=T'_{toa}-T'_{channel}$, and calculating location information of the target UE based on the propagation delay by using a TOA/TDOA mechanism, where the step of calculating a channel latency $T'_{channel}$ includes the channel latency calculation methods mentioned above.

In summary, after calculating the channel latency $T'_{channel}$, the processor of the positioning device calculates the time of arrival $T'_{toa}$ based on the radio signal transmitted by the target UE to the antenna, calculates the propagation delay $T'_{pass}$ according to the preset calibration formula, where the preset calibration formula is $T'_{pass}=T'_{toa}-T'_{channel}$, and calculates the location information of the target UE based on the propagation delay by using the TOA/TDOA mechanism. Because the propagation delay is unrelated to a channel on the base station side and is not affected by the channel latency, the obtained location information of the target UE is not affected by a difference between channels of different stations. This increases positioning precision in the positioning method in this embodiment of the present invention.

Figure 21:
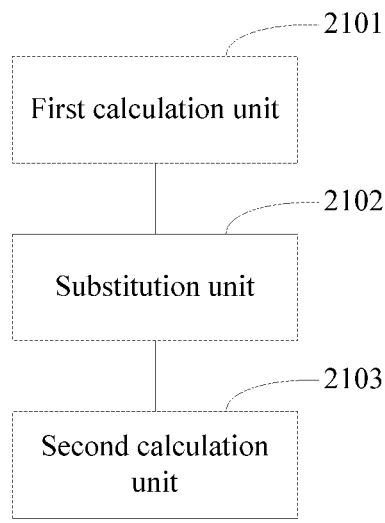
FIG. 21 is a schematic structural diagram of a communications device according to another embodiment of the present invention.

FIG. 21 is a schematic structural diagram of a communications device according to an embodiment of the present invention. The communications device shown in FIG. 21 may be configured to perform the channel latency determining method shown in FIG. 19. Referring to FIG. 21, the communications device in this embodiment of the present invention includes: a first calculation unit 2101, configured to calculate a time of arrival based on a radio signal transmitted by each calibration UE to an antenna of each station, where the time of arrival is a time obtained through calculation according to a TOA estimation algorithm, there are M stations and N calibration UEs, M and N are positive integers greater than 0, and M×N≥2×N+M+N−1, a substitution unit 2102, configured to substitute prestored location information of the station into a propagation delay expression to obtain a propagation delay, where the propagation delay expression includes device location information of the calibration UE, the device location information is an unknown number, and the propagation delay is a time from transmitting the radio signal by the calibration UE to receiving the radio signal by the antenna, and a second calculation unit 2103, configured to calculate a channel latency based on the propagation delay and the time of arrival, where the channel latency is positively correlated with the time of arrival and is negatively correlated with the propagation delay, the channel latency is negatively correlated with a delay adjustment value, and the delay adjustment value is an unknown number.

Optionally, the propagation delay expression is: $T_{pass}=\text{sqrt}((eNb\_x^j-Ue\_x^i)^2+(eNb\_y^j-Ue\_y^i)^2)/c$, and the propagation delay and the time of arrival are substituted into a second preset formula to obtain the following formula: $T_{toa}^{i,j}=T^j_{channel}+\text{sqrt}((eNb\_x^j-Ue\_x^i)^2+(eNb\_y^j-Ue\_y^i)^2)/c+TA^i$, where $T_{toa}^{i,j}$ represents a time of arrival of a radio signal from $i^{th}$ calibration UE to an antenna of a $j^{th}$ station, $T^j_{channel}$ represents a channel latency of the $j^{th}$ station, $(eNb\_x^j, eNb\_y^j)$ represents location information of the $j^{th}$ station, $(Ue\_x^i, Ue\_y^i)$ represents device location information of the $i^{th}$ calibration UE, c represents a propagation speed of the radio signal, $T_{pass}$ represents a propagation delay, $TA^i$ represents a delay adjustment value of the $i^{th}$ calibration UE, sqrt represents a square root function, and i and j are natural numbers.

In summary, the first calculation unit 2101 calculates the time of arrival based on the radio signal transmitted by each calibration UE to the antenna of each station, where the time of arrival is the time obtained through calculation according to the TOA estimation algorithm, there are M stations and N calibration UEs, M and N are positive integers greater than 0, and M×N≥2×N+M+N−1, the substitution unit 2102 substitutes the prestored location information of the station into the propagation delay expression to obtain the propagation delay, where the propagation delay expression includes the device location information of the calibration UE, the device location information is an unknown number, and the propagation delay is the time from transmitting the radio signal by the calibration UE to receiving the radio signal by the antenna, and the second calculation unit 2103 calculates the channel latency based on the propagation delay and the time of arrival, where the channel latency is positively correlated with the time of arrival and is negatively correlated with the propagation delay, the channel latency is negatively correlated with the delay adjustment value, and the delay adjustment value is an unknown number. In this way, after substituting the location information of the station into the propagation delay expression, the communications device obtains the propagation delay represented by using the location information of the station and the device location information of the calibration UE, and can obtain channel latencies based on a plurality of propagation delays and a plurality of times of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

An embodiment of the present invention further provides a communications device. For details, refer to FIG. 16. The communications device also has a hardware structure similar to that of the communications device shown in FIG. 16. In the another embodiment of the communications device according to an embodiment of the present invention, specifically, the communications device may vary relatively greatly due to different configurations or performance, and may include at least one processor (CPU) (for example, at least one processor), a memory, a baseband circuit, a radio frequency circuit, and an antenna. These components may perform communication through a bus.

The memory may be temporary storage or persistent storage. A program stored in the memory may include at least one module (not shown in the figure), where each module may include a series of instruction operations for the communications device. Further, the processor may be set to communicate with the memory, and perform, on the communications device, the series of instruction operations in the memory.

Steps performed by the communications device in the embodiment shown in FIG. 19 may be based on the hardware structure of the communications device in this embodiment of the present invention. An apparatus structure of the communications device shown in FIG. 21 may be integrated on the hardware structure of the communications device in this embodiment of the present invention.

Specific cases are as follows: The processor has the following functions: calculating a time of arrival based on a radio signal transmitted by each calibration UE to an antenna of each station, where the time of arrival is a time obtained through calculation according to a TOA estimation algorithm, there are M stations and N calibration UEs, M and N are positive integers greater than 0, and M×N≥2×N+M+N−1, substituting prestored location information of the station into a propagation delay expression to obtain a propagation delay, where the propagation delay expression includes device location information of the calibration UE, the device location information is an unknown number, and the propagation delay is a time from transmitting the radio signal by the calibration UE to receiving the radio signal by the antenna, and calculating a channel latency based on the propagation delay and the time of arrival.

Optionally, the processor has the following function: determining the channel latency based on the propagation delay and the time of arrival by using a second preset formula.

In summary, the processor calculates the time of arrival based on the radio signal transmitted by each calibration UE to the antenna of each station, where the time of arrival is the time obtained through calculation according to the TOA estimation algorithm, there are M stations and N calibration UEs, M and N are positive integers greater than 0, and M×N≥2×N+M+N−1, the processor substitutes the prestored location information of the station into the propagation delay expression to obtain the propagation delay, where the propagation delay expression includes the device location information of the calibration UE, the device location information is an unknown number, and the propagation delay is the time from transmitting the radio signal by the calibration UE to receiving the radio signal by the antenna, and the processor calculates the channel latency based on the propagation delay and the time of arrival, where the channel latency is positively correlated with the time of arrival and is negatively correlated with the propagation delay, the channel latency is negatively correlated with a delay adjustment value, and the delay adjustment value is an unknown number. In this way, after substituting the location information of the station into the propagation delay expression, the communications device obtains the propagation delay represented by using the location information of the station and the device location information of the calibration UE, and can obtain channel latencies based on a plurality of propagation delays and a plurality of times of arrival. Therefore, in this embodiment of the present invention, the channel latency can be accurately measured, and during a process of positioning another UE by using a TOA/TDOA mechanism-based positioning method, the channel latency can be subtracted from the time of arrival. This increases positioning precision in a positioning mechanism affected by the channel latency.

What is claimed is:

1. A channel latency determining method, comprising:
    obtaining, by a communications device, device location information of a calibration user equipment (UE);
    calculating, by the communications device, a propagation delay according to the device location information and further according to prestored location information of an antenna, wherein the propagation delay is a time between transmitting a radio signal by the calibration UE and receiving the radio signal by the antenna;
    calculating, by the communications device, a time of arrival according to the radio signal transmitted by the calibration UE to the antenna, wherein the time of arrival is a time obtained through calculation according to a time of arrival (TOA) estimation algorithm; and
    determining, by the communications device, a channel latency according to the propagation delay and the time of arrival, wherein the channel latency is positively correlated with the time of arrival and is negatively correlated with the propagation delay, wherein the channel latency being positively correlated with the time of arrival comprises an increase in the time of arrival being associated with an increase in the channel latency and further comprises a decrease in the time of arrival being associated with a decrease in the channel latency, and wherein the channel latency being negatively correlated with the propagation delay comprises an increase in the time of arrival being associated with a decrease in the channel latency and further comprises a decrease in the time of arrival being associated with an increase in the channel latency.

2. The method according to claim 1, further comprising:
    performing user positioning in an asynchronous communications system according to the channel latency; and
    performing automatic channel calibration in the asynchronous system using a time of arrival/time difference of arrival (TOA/TDOA) mechanism and according to the user positioning.

3. The method according to claim 1, wherein the obtaining, by the communications device, device location information of calibration UE comprises performing at least one of a first obtaining process or a second obtaining process, wherein the first obtaining process comprises:
    obtaining, by the communications device, the radio signal transmitted by the calibration UE to at least three antennas;
    calculating, by the communications device based on the radio signal, a reference signal received power (RSRP) of the radio signal obtained by each antenna; and
    determining, by the communications device, prestored location information of a target antenna as the device location information in response to a first RSRP of the radio signal obtained by the target antenna being greater than a second RSRP of the radio signal obtained by another antenna and further in response to a difference between the first RSRP and second RSRP meeting a preset signal threshold, wherein the target antenna and the another antenna are antennas of the at least three antennas; and
wherein the second obtaining process comprises:
    obtaining, by the communications device, neighboring cell measurement information sent by the calibration UE, wherein the neighboring cell measurement information is obtained through calculation by the calibration UE according to downlink common channel information sent by a reference node, and wherein the communications device prestores location information of the reference node; and
    selecting, by the communications device, the prestored location information of the reference node as the device location information in response to the neighboring cell measurement information being greater than a preset neighboring cell threshold.

4. The method according to claim 1, wherein the obtaining, by a communications device, device location information of calibration UE comprises:
    obtaining, by the communications device, the radio signal transmitted by the calibration UE to the antenna; and
    calculating, by the communications device, an angle at which the radio signal arrives at the antenna; and
    calculating, by the communications device, the device location information according to the angle using an angle of arrival (AOA) mechanism.

5. The method according to claim 4, wherein the method further comprises performing, after the calculating, by the communications device, the device location information according to the angle using the AOA mechanism:
    calculating, by the communications device, a confidence level of the device location information based on the signal of the calibration UE; and
    when the confidence level is greater than a preset confidence level threshold, performing, by the communications device, the step of calculating a propagation delay based on the device location information and prestored location information of an antenna.

6. The method according to claim 1, wherein the obtaining, by the communications device, device location information of calibration UE comprises:
    obtaining, by the communications device, downlink reference signal received powers (RSRPs) of at least three cells sent by the calibration UE, wherein each of the downlink RSRPs is a downlink reference signal received power measured by the calibration UE, and wherein the antenna is an antenna of the cell;

matching, by the communications device, the downlink RSRP with a target downlink RSRP, to obtain a match degree; and selecting, by the communications device, target location information corresponding to the target downlink RSRP as the device location information in response to the match degree being greater than a preset match degree threshold, wherein the communications device prestores a correspondence between the target downlink RSRP and the target location information.

7. The method according to claim 1, further comprising performing, after the obtaining, by the communications device, the device location information sent by the calibration UE:

calculating, by the communications device, a signal-to-noise ratio (SNS) based on the radio signal transmitted by the calibration UE; and calculating, by the communications device, in response to the SNS being greater than a preset SNS threshold, a propagation delay according to the device location information and prestored location information of an antenna.

8. The method according to claim 1, wherein the determining, by the communications device, the channel latency according to the propagation delay and the time of arrival comprises:

determining, by the communications device, the channel latency according to the propagation delay and the time of arrival using a first preset formula;

wherein the first preset formula is $T_{channel} = T_{toa} - T_{pass}$, wherein $T_{pass}$ represents a propagation delay, wherein $T_{toa}$ represents a time of arrival, and wherein $T_{channel}$ represents a channel latency.

9. A communications device, comprising:
a processor; and
a non-transitory computer-readable storage medium storing a program to be executed by the processor, the program including instructions for:
obtain device location information of a calibration user equipment (UE);
calculate a propagation delay according to the device location information and further according to prestored location information of an antenna, wherein the propagation delay is a time between transmitting a radio signal by the calibration UE and receiving the radio signal by the antenna;
calculate a time of arrival (TOA) based on the radio signal transmitted by the calibration UE to the antenna, wherein the time of arrival is a time obtained through calculation according to a TOA estimation algorithm; and
determine a channel latency according to the propagation delay and the time of arrival, wherein the channel latency is positively correlated with the time of arrival and is negatively correlated with the propagation delay, wherein the channel latency being positively correlated with the time of arrival comprises an increase in the time of arrival being associated with an increase in the channel latency and further comprises a decrease in the time of arrival being associated with a decrease in the channel latency, and wherein the channel latency being negatively correlated with the propagation delay comprises an increase in the time of arrival being associated with a decrease in the channel latency and further comprises a decrease in the time of arrival being associated with an increase in the channel latency.

10. The communications device according to claim 9, wherein the instructions to obtain the device location information of the calibration UE include instructions to:

obtain the radio signal transmitted by the calibration UE to at least three antennas;

calculate, according to the radio signal, a reference signal received power (RSRP) of a signal obtained by each antenna;

determine prestored location information of a target antenna as the device location information when a first RSRP of a signal obtained by the target antenna is greater than a second RSRP of a signal obtained by another antenna and a difference between the first RSRP and the second RSRP meets a preset signal threshold, wherein the target antenna and the another antenna are antennas in the at least three antennas.

11. The communications device according to claim 9, wherein the instructions to obtain the device location information of the calibration UE include instructions to:

obtain positioning information of the calibration UE;
determine the device location information according to the positioning information;
obtain neighboring cell measurement information sent by the calibration UE, wherein the neighboring cell measurement information is obtained through calculation by the calibration UE based on downlink common channel information sent by a reference node, and the communications device prestores location information of the reference node; and
select the prestored location information of the reference node as the device location information when the neighboring cell measurement information is greater than a preset neighboring cell threshold.

12. The communications device according to claim 9, wherein the instructions to obtain the device location information of the calibration UE include instructions to:

obtain positioning information of the calibration UE;
determine the device location information based on the positioning information;
obtain the radio signal transmitted by the calibration UE to an antenna;
calculate an angle at which the radio signal arrives at the antenna; and
calculate the device location information based on the angle by using an angle of arrival (AOA) mechanism.

13. The communications device according to claim 12, wherein the program further includes instructions to:

calculate a confidence level of the device location information based on the signal of the calibration UE; and
calculate, in response to the confidence level being greater than a preset confidence level threshold, the propagation delay according to the device location information and prestored location information of an antenna.

14. The communications device according to claim 9, wherein the instructions to obtain the device location information of the calibration UE include instructions to:

obtain positioning information of the calibration UE;
determine the device location information based on the positioning information;
obtain downlink reference signal received powers (RSRPs) of at least three cells sent by the calibration UE, wherein the downlink RSRP is a downlink reference signal received power measured by the calibration UE, and the antenna is an antenna of the cell;

match the downlink RSRP with a target downlink RSRP, to obtain a match degree; and select target location information corresponding to the target downlink RSRP as the device location information when the match degree is greater than a preset match degree threshold, wherein the communications device prestores a correspondence between the target downlink RSRP and the target location information.

15. The communications device according to claim 9, wherein the program further includes instructions to:

calculate a signal-power-to-noise-power ratio SNS based on the radio signal transmitted by the calibration UE; and calculate, in response to the SNS being greater than a preset SNS threshold, a propagation delay according to the device location information and prestored location information of an antenna.

16. The communications device according to claim 9, wherein the instructions to determine the channel latency according to the propagation delay and the time of arrival include instructions to:

determine the channel latency based on the propagation delay and the time of arrival by using a first preset formula;

wherein the first preset formula is $T_{channel}=T_{toa}-T_{pass}$, wherein $T_{pass}$ represents a propagation delay, wherein $T_{toa}$ represents a time of arrival, and wherein $T_{channel}$ represents a channel latency.

17. A non-transitory computer readable medium comprising a computer program stored thereon, the program executable by one or more digital processors for determining channel latency, the computer program including instructions for:

obtaining device location information of a calibration user equipment (UE);

calculating a propagation delay according to the device location information and further according to prestored location information of an antenna, wherein the propagation delay is a time between transmitting a radio signal by the calibration UE and receiving the radio signal by the antenna;

calculating a time of arrival according to the radio signal transmitted by the calibration UE to the antenna, wherein the time of arrival is a time obtained through calculation according to a time of arrival (TOA) estimation algorithm; and determining a channel latency according to the propagation delay and the time of arrival, wherein the channel latency is positively correlated with the time of arrival and is negatively correlated with the propagation delay, wherein the channel latency being positively correlated with the time of arrival comprises an increase in the time of arrival being associated with an increase in the channel latency and further comprises a decrease in the time of arrival being associated with a decrease in the channel latency, and wherein the channel latency being negatively correlated with the propagation delay comprises an increase in the time of arrival being associated with a decrease in the channel latency and further comprises a decrease in the time of arrival being associated with an increase in the channel latency.

18. The non-transitory computer readable medium according to claim 17, wherein the instructions for obtaining the device location information of the calibration UE include instructions for:

obtaining the radio signal transmitted by the calibration UE to at least three antennas;

calculating, according to the radio signal, a reference signal received power (RSRP) of the radio signal obtained by each antenna; and determining prestored location information of a target antenna as the device location information in response to a first RSRP of the radio signal obtained by the target antenna being greater than a second RSRP of the radio signal obtained by another antenna and further in response to a difference between the first RSRP and second RSRP meeting a preset signal threshold, wherein the target antenna and the another antenna are antennas of the at least three antennas.

19. The non-transitory computer readable medium according to claim 17, wherein the instructions for obtaining the device location information of the calibration UE include instructions for:

obtaining neighboring cell measurement information sent by the calibration UE, wherein the neighboring cell measurement information is obtained through calculation by the calibration UE according to downlink common channel information sent by a reference node, and wherein the communications device prestores location information of the reference node; and selecting the prestored location information of the reference node as the device location information in response to the neighboring cell measurement information being greater than a preset neighboring cell threshold.

20. The non-transitory computer readable medium according to claim 17, wherein the instructions for obtaining the device location information of the calibration UE include instructions for:

obtaining the radio signal transmitted by the calibration UE to the antenna; and calculating an angle at which the radio signal arrives at the antenna; and calculating the device location information according to the angle using an angle of arrival (AOA) mechanism.

* * * * *